US011897090B1

(12) United States Patent
Hines

(10) Patent No.: US 11,897,090 B1
(45) Date of Patent: Feb. 13, 2024

(54) ORIENTATION INDEPENDENT TOOL FOR UNDERGROUND STOP AND WASTE VALVE

(71) Applicant: Peter H. Hines, Murray, UT (US)

(72) Inventor: Peter H. Hines, Murray, UT (US)

( * ) Notice: Subject to any disclaimer, the term of this patent is extended or adjusted under 35 U.S.C. 154(b) by 195 days.

(21) Appl. No.: 17/187,709

(22) Filed: Feb. 26, 2021

Related U.S. Application Data

(60) Provisional application No. 63/094,903, filed on Oct. 22, 2020.

(51) Int. Cl.
*B25B 13/10* (2006.01)
*B25B 23/00* (2006.01)
*B25B 15/00* (2006.01)

(52) U.S. Cl.
CPC .......... *B25B 13/105* (2013.01); *B25B 15/001* (2013.01); *B25B 23/0035* (2013.01)

(58) Field of Classification Search
CPC ....... B25B 13/105; B25B 13/48; B25B 13/06; B25B 15/001; B25B 23/0035; B25B 23/0085; B25B 23/14; F16B 43/00; F16B 43/002; F16B 39/24; F16B 23/0061
USPC ............................ 81/438, 185, DIG. 11, 186
See application file for complete search history.

(56) References Cited

U.S. PATENT DOCUMENTS 3,674,070 A 7/1972 Mahoney
3,698,267 A * 10/1972 Denney ................ B25B 15/001 81/185
4,887,498 A 12/1989 Zayat
5,193,420 A 3/1993 Smith
5,287,778 A 2/1994 Cook
5,622,090 A * 4/1997 Marks .................. B25B 13/105 81/DIG. 11
5,622,906 A 4/1997 Marks
5,644,959 A 7/1997 Howard
5,664,467 A 9/1997 Breeze
5,791,209 A 8/1998 Marks
5,937,715 A * 8/1999 Lin ...................... B25B 13/105 81/DIG. 11
6,023,999 A * 2/2000 Cho ...................... B25B 13/105 81/DIG. 11
6,085,619 A 7/2000 Blake et al.
6,138,534 A * 10/2000 Cho ...................... B25B 13/105 81/DIG. 11

(Continued)

FOREIGN PATENT DOCUMENTS

CN 105710846 6/2016
CN 106903637 6/2017

(Continued)

*Primary Examiner* — Don M Anderson
*Assistant Examiner* — Jason Khalil Hawkins
(74) *Attorney, Agent, or Firm* — Brian C. Trask

(57) ABSTRACT

A tool including a wrench attached to an elongate shaft to open and close a subterranean stop and waste valve. The wrench may be removably coupled to the shaft by way of an attach mechanism. Sometimes, the attach mechanism can be configured to couple with the distal end of a commercially available valve actuation tool. The instant tool can couple with the actuating handle of the stop and waste valve at a plurality of orientations of the tool's handle with respect to the valve's handle. A preferred wrench includes anti-stiction structure to facilitate insertion and retraction of the wrench with respect to an access port for the valve.

12 Claims, 21 Drawing Sheets

(56) References Cited

U.S. PATENT DOCUMENTS

| | | | | |
|---|---|---|---|---|
| 6,374,710 | B2 * | 4/2002 | Kuo | B25B 13/105 81/448 |
| 6,928,906 | B1 | 8/2005 | Marks | |
| 7,036,402 | B1 * | 5/2006 | Marks | B25B 13/48 81/177.2 |
| 7,117,883 | B1 | 10/2006 | Vitalo | |
| 7,311,020 | B2 | 12/2007 | George | |
| 7,562,605 | B2 * | 7/2009 | Kunkel | B25B 13/50 81/176.1 |
| 7,886,637 | B2 * | 2/2011 | Campbell | B25B 13/105 81/DIG. 11 |
| 10,554,954 | B2 | 2/2020 | Berman | |
| 10,589,403 | B2 * | 3/2020 | Lin | B25B 13/06 |
| 2008/0028897 | A1 * | 2/2008 | Hu | B25B 13/06 81/121.1 |
| 2017/0320200 | A1 | 11/2017 | Fang et al. | |

FOREIGN PATENT DOCUMENTS

| | | |
|---|---|---|
| CN | 107116502 | 9/2017 |
| GB | 2017557 | 10/1979 |
| GB | 2316900 | 3/1998 |

* cited by examiner

ORIENTATION INDEPENDENT TOOL FOR UNDERGROUND STOP AND WASTE VALVE

BACKGROUND

Field of the Invention

This invention relates to hand operated tools for opening and closing valves. A particular application encompasses actuation of an underground stop and waste valve.

State of the Art

It is known to control flow of fluid in a fluid circuit including pipes or conduit elements by opening or closing one or more valves disposed in the circuit. Sometimes, a valve must be located in a remote location that makes orientation of a valve handle difficult to determine. For example, sprinkler systems in the northern portion of the United States commonly include a stop and waste valve located underground below the frost line.

With reference to FIGS. 1 and 2, a conventional plumbing arrangement includes a small diameter access port 100 that extends vertically from an underground valve, indicated at 102, to the ground surface. Valve 102 can be opened or closed to permit or resist flow of water in pipe 103. A prior art wrench 104 carried on an elongate shaft 106 may be inserted into the access port 100 to turn the valve's handle 108. The small diameter and length of the access port 100 generally makes it dark and difficult to see the valve handle 108. Sometimes, water and/or mud may interfere with the line of sight. Consequently, the orientation of the wrench 104 with respect to the valve handle 108 can be difficult to dispose the open end indicated at 110 into an operable alignment to receive valve handle 108 in engagement inside socket 112. The valve handle 108 may engage with wrench socket 112 at only two orientations of the valve actuation tool's lever (or tool handle) that are spaced apart by a 180 degree shaft rotation. From a user's perspective, engagement of valve handle 108 in wrench socket 112 occurs at a single orientation of the valve actuation tool's above-ground lever.

Access ports are conventionally formed from PVC conduit ranging in diameter from 2 to 4 inches. The stop and waste valve may be located at an eccentric and random location of a cross-section inside the access port. The uncertainty of valve location increases with increase in access port diameter. Difficulty in coupling a valve actuation tool to a valve handle can be compounded by uncertainty in valve location in addition to valve handle orientation relative to wrench opening.

A number of United States utility patents have issued which disclose socket wrench-like tools that include biased pin elements capable of self-forming sockets to receive bolt heads of variable size, and the like. Exemplary such patents include U.S. Pat. Nos. 5,193,420; 5,622,090; 5,644,959; 5,664,467; 5,791,209; 6,085,619; 6,138,534; and 6,928,906. The above-referenced patents are hereby incorporated herein in their entirety by this reference for their teachings of various biased pin structures.

It would be an improvement to provide a valve actuation tool capable of engagement at a plurality of tool orientations with respect to the handle of an underground stop and waste valve. A further improvement would provide more simple and reliable engagement of the tool and an underground valve's handle when the valve is disposed at an unknown subterranean position. Desirably, an improved tool may include provision to resist stiction in a valve access port.

Certain embodiments may provide a compact wrench sized to reduce shipping costs. One contemplated embodiment may include a removable coupling mechanism between a wrench and a shaft (e.g., to potentially promote reuse of an existing valve actuation tool's shaft).

BRIEF SUMMARY OF THE INVENTION

Preferred embodiments according to certain principles of the instant invention provide a tool that can be used to open or close an underground stop and waste valve. One such tool includes a shaft extending in a shaft length axis direction between proximal and distal shaft ends, the shaft having a length in excess of about three feet.

Desirably, a lever is associated with the shaft to apply a torque to the shaft at a location spaced apart from the distal shaft end. The distal end of the shaft carries a wrench with a distally oriented wrench end configured and arranged to couple with the actuating handle of a stop and waste valve. Preferably, wrench-to-valve coupling may be effected to variably dispose the tool's lever at a plurality of user perceptible lever orientations clocked at discrete increments about the shaft length axis. Such a construction facilitates engagement of the wrench with a valve handle that is disposed at an eccentric or unknown position inside an access port. The preferred plurality of interface orientations earns certain embodiments the distinction of being orientation independent.

Sometimes, a tool may include an attachment mechanism configured to couple the wrench in operable association with the distal end of a shaft. Certain attachment mechanisms may be configured and arranged to also permit removal of the wrench from engagement with the shaft. One operable attach mechanism may even join a wrench to the distal end of the shaft of a commercially available stop and waste valve actuation tool. In that case, the attachment mechanism is desirably configured to provide automatic registration of a wrench working axis of rotation substantially in parallel with the length axis of the shaft. It is further preferred for the wrench axis of rotation to be at least near the shaft's axis of rotation.

In general, a wrench according to certain principles of the invention will include at least three distally projecting fingers, the fingers normally protruding in a distal direction beyond a plane disposed normal to the shaft length axis and containing a portion of the distal end of a wrench housing. Such an arrangement facilitates engagement of the valve handle in a socket of the wrench before encountering a structural interference with a distal portion of the wrench, or other structure of a wrench housing. It is preferred for at least one of the fingers to be structured for axial reciprocation and biased toward a normally extended position.

Certain wrenches may include anti-stiction structure to facilitate insertion and retraction of the wrench into, and out of, a stop and waste valve's access port having a two inch inside diameter. One operable anti-stiction structure includes a bypass area between a blocking cross-section area of the wrench and an open cross-section of an access port, the bypass area being greater than 0.14 square inches. In another case, the anti-stiction structure includes a bypass area between a cross-section of the wrench and a wrench gage diameter, the bypass area being greater than 0.16 square inches. Sometimes, an anti-stiction structure may simply include a nonzero bypass area between a blocking cross-section of the wrench and a wrench gage diameter. A workable bypass area can include a vent formed in a wrench housing. One workable vent includes a scallop disposed at a housing perimeter. An alternative workable vent may include a conduit communicating from a distal end of the wrench to a proximal end of the wrench. In certain cases, the conduit can be disposed spaced apart from a housing perimeter.

A currently preferred wrench includes a housing defining a volume between a distal face and a proximal face. A plurality of parallel bores may be distributed in the volume to dispose a distal end of each bore as an opening communicating through the distal face. A workable wrench may also include a plurality of fingers. Typically, at least one finger of the fingers includes a working end and a held portion, the working end being configured and arranged to protrude distally beyond the distal face to a desired extended working position, the held portion to fit in registration inside one of the bores for reciprocal displacement parallel to a bore length axis. Certain wrenches also include a plurality of stop elements, at least one stop element of the stop elements to resist displacement of the working end of the at least one finger in a distal direction beyond the desired extended position. Wrenches with reciprocating fingers also typically include a plurality of biasing elements, at least one biasing element of the biasing elements to urge motion of the at least one finger in a distal direction.

The housing of a wrench may include a distal wall associated with a distal wrench face and a proximal wall associated with a proximal wrench face. It is within contemplation that the distal and proximal walls can capture a full complement of installed fingers and biasing elements, inside the housing and in registration for reciprocal finger displacement along respective bore length axes, during assembly of the housing. Sometimes, a body of the housing can include a scallop or other bypass area to resist stiction during insertion and withdrawal of the housing into and from an access conduit extending toward a subterranean target stop and waste valve.

Desirably, a plurality of retractable fingers are retained in a workable relation with respect to the housing of a wrench. A preferred retractable finger includes a cylindrical held portion having a first diameter and a cylindrical working end having a second diameter, the first diameter being greater than the second diameter, a first shoulder disposed between the first diameter and the second diameter. A stop element including a protrusion may be disposed in one of the bores to form a structural interference between the first shoulder and the protrusion. In that case, held portions of the fingers are retained in registration in respective bores. Certain embodiments include bores that are arrayed in space by a honeycomb-like element in a wrench housing to dispose adjacent fingers in a spaced apart relationship to resist transverse load transfer from a load-carrying finger to an adjacent finger.

A currently preferred wrench includes a housing defining a volume between a distal face and a proximal face. A plurality of parallel bores may be distributed in the volume to dispose a distal end of each bore as an opening communicating through the front face. A preferred wrench also includes a plurality of fingers, at least one finger includes a working end and a held portion. The working end of a finger is preferably configured and arranged to protrude distally beyond the front face to a desired extended position. The held portion is configured to fit in registration inside one of the bores for reciprocal displacement parallel to a bore length axis. The preferred wrench further includes at least one stop element. A workable stop element is configured to resist displacement of the working end of the at least one finger in a distal direction beyond the desired extended position. The preferred wrench includes a plurality of biasing elements, at least one biasing element of the biasing elements to urge motion of the at least one finger in a distal direction.

In a workable embodiment, the housing includes a front wall associated with the distal face and a rear wall associated with the proximal face, the front wall and rear wall cooperating to capture a full complement of installed fingers and biasing elements inside the housing and in registration for reciprocal displacement along respective bore length axes during assembly of the housing. A wrench may further include an attachment mechanism configured to removably couple the housing to the distal end of an elongate shaft to automatically dispose a desired axis of rotation of the housing in a substantial parallel association with the length or rotation axis of the shaft. A workable shaft is operable to apply a torque to the housing. In one case, the attachment mechanism includes a primary coupling element and a redundant secondary coupling element to resist axial separation between the housing and the shaft.

Sometimes, the housing includes anti-stiction structure to resist stiction during insertion and withdrawal of the housing into and from an access port having a two inch inside diameter and extending from a ground surface opening toward a target subterranean stop and waste valve. A workable anti-stiction structure includes a bypass area between a blocking cross-section area of the housing and an open cross-section of the access port. It is currently preferred for the bypass area to be greater than about 0.14 square inches.

In the preferred embodiment, the at least one finger includes a cylindrical held portion having a first diameter and a cylindrical working end having a second diameter, the first diameter being greater than the second diameter, a first shoulder disposed between the first diameter and the second diameter. A stop element including a protrusion may be disposed in one of the bores to form a structural interference between the first shoulder and the protrusion. In certain embodiments, the bores can be arrayed to dispose adjacent fingers in a spaced apart relationship to resist transverse load transfer from a load-carrying finger to an adjacent finger.

BRIEF DESCRIPTION OF THE DRAWINGS

In the drawings, which illustrate what are currently considered to be the best modes for carrying out the invention.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow.

Figure 2:
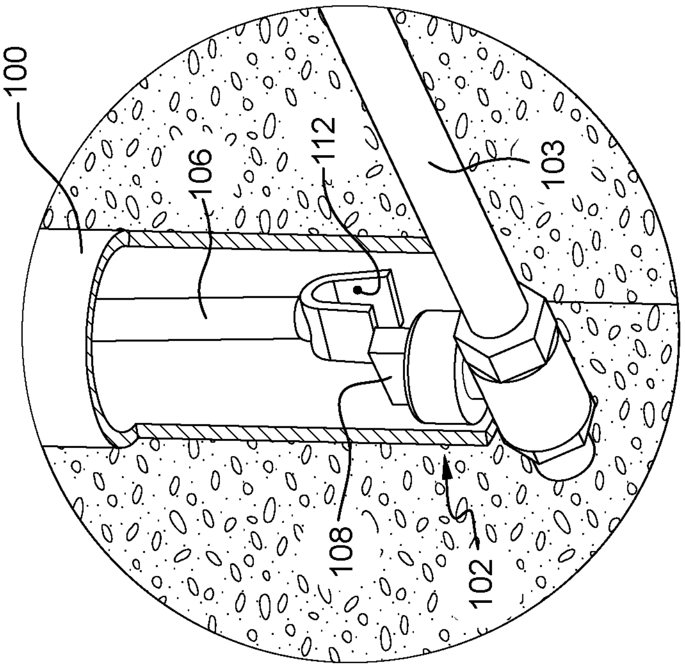
FIG 2 PRIOR ART
FIG. 2 is a cut-away view from below of the embodiment in FIG. 1.
Figure 1:
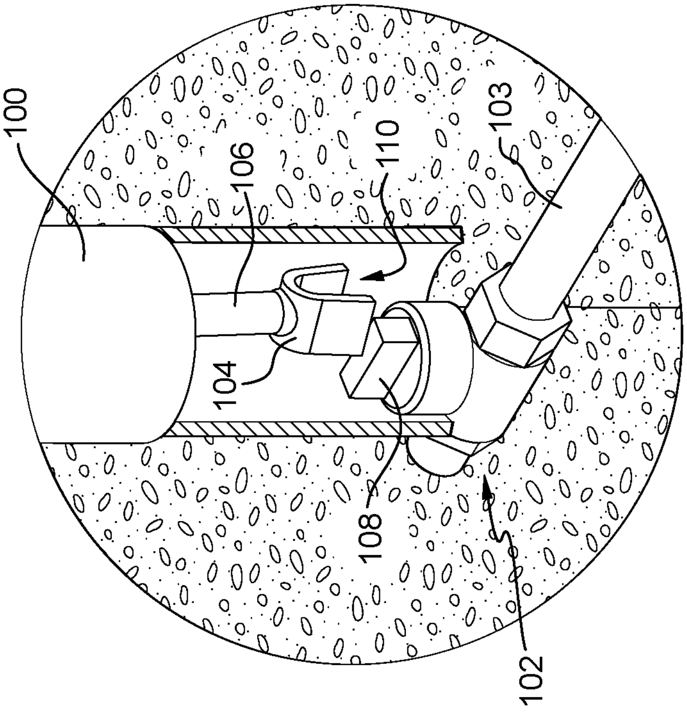
FIG 1 PRIOR ART
FIG. 1 is a cut-away view in perspective from above of a commercially available stop and waste valve and valve actuation tool.
Figure 3:
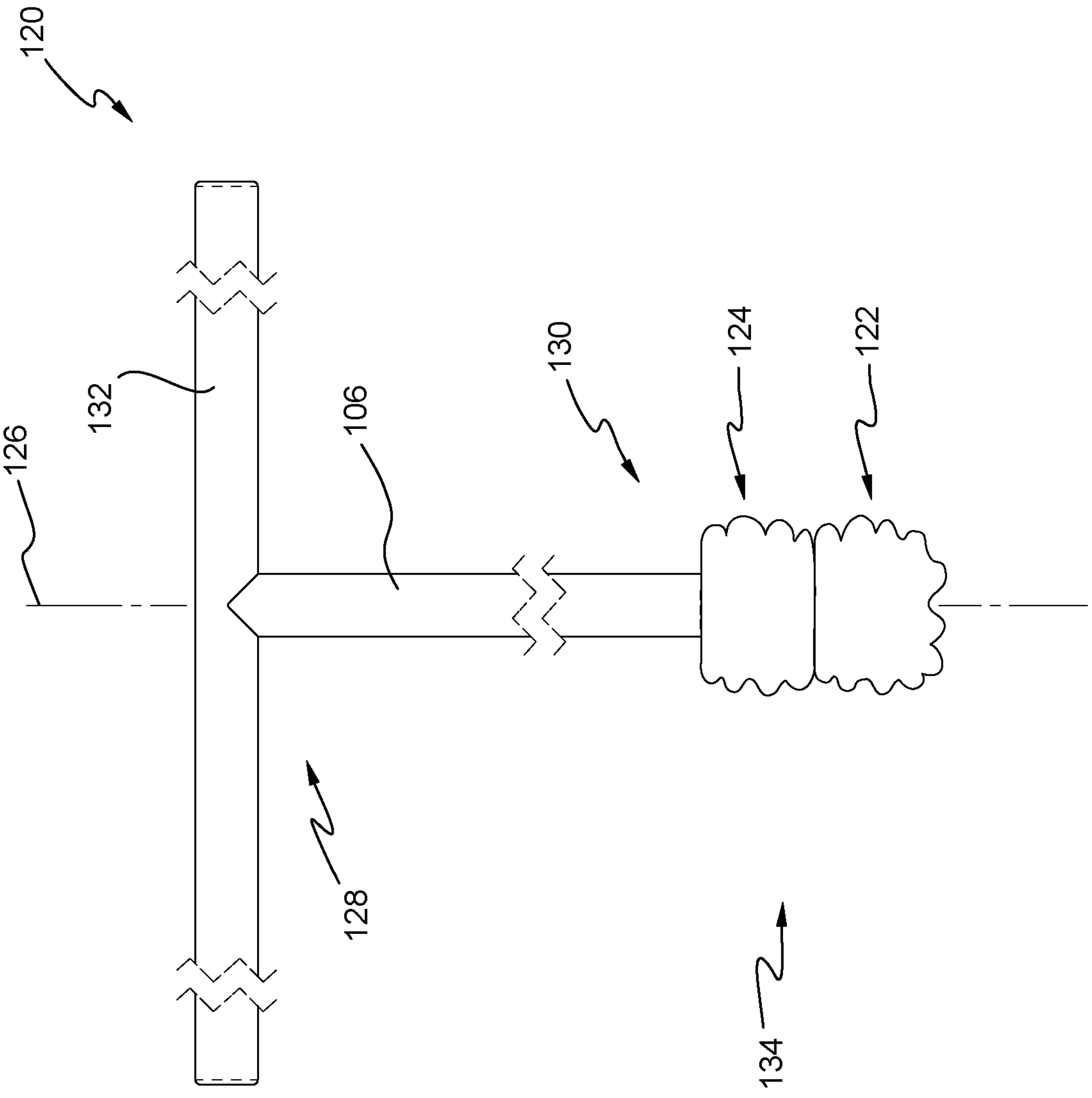
FIG. 3 is a side view in elevation of a generalized embodiment according to certain principles of the instant invention.

With reference to FIG. 3, an exemplary embodiment of a tool to operate a stop and waste valve according to certain principles of the invention is generally indicated at 120. A tool 120 may include a wrench, generally 122, and an attachment mechanism, generally 124. An attachment mechanism 124 is typically configured to couple the wrench 122 in operable association with an end of an elongate tool shaft 106. Illustrated tool shaft 106 extends along a shaft length axis 126 between proximal end 128 and distal end 130. Length axis 126 may also be regarded as representative of an axis of rotation for the shaft 106. A workable shaft 106 will typically have a length in excess of about three feet.

Typically, a lever 132 is associated with the shaft 106 to apply a torque to the shaft at a location spaced apart from the distal shaft end 130. Preferred embodiments may be characterized as orientation independent, which relates to relative orientation of a lever 132 and a valve handle of a stop and waste valve. As will be explained in more detail below, tool 120 includes a wrench 122 with a distal wrench end configured and arranged to couple with the actuator handle of a stop and waste valve to variably dispose the lever 132 at a plurality of user perceptible lever orientations clocked at discrete increments about the shaft length axis 126. In contrast, the prior art wrench 104 (and its lever/handle) may couple with a valve handle at a single orientation.

As also explained in more detail below, an operable attachment mechanism 124 may sometimes include structure configured to make a permanent connection between a wrench 122 and a shaft 106. Exemplary such permanent connection structure includes welds of various sorts and adhesive joints as known in the art. Other times, attachment mechanism 124 may include structure configured to make a releasable connection between a wrench 122 and a shaft 106. Exemplary such releasable connection structure includes one or more threaded fastener, bayonet socket arrangements, snap-together assemblies, a clevis pin received in a cooperating retaining element, and the like. Sometimes, an attachment mechanism 124 may be configured to couple a wrench 122 to a commercially available stop and waste valve actuation tool having less versatility than an embodiment according to certain principles of the invention.

A workable wrench according to certain principles of the invention includes at least three distally projecting fingers to engage a valve handle at a plurality of actuation tool orientations. One or more of the fingers may be configured to reciprocate and be biased toward a normally extended position. Desirably, a biased finger will project distally beyond a plane disposed normal to the length axis 126 and containing the most distal portion of a wrench housing. In that construction, a valve handle can be engaged inside a socket between fingers before encountering a structural interference with a distally protruding finger side-supporting wall.

Preferred embodiments of a wrench 122 include anti-stiction structure, generally 134 to facilitate insertion and retraction of the wrench 122 into, and out of, the access port of a ubiquitous stop and waste valve. Exemplary such anti-stiction structure will be explained in more detail below with reference to FIGs. amenable to illustration of sufficient detail.

As previously mentioned, a wrench 122 may be characterized as having a housing. Sometimes, the housing holds a volume in which to dispose a portion of one or more reciprocating finger. Certain fingers may not reciprocate. Sometimes, a finger may simply be affixed in some way to a simple housing to project a terminal portion of the finger in a distal direction to engage with, and apply torque to, a handle of a stop and waste valve.

Figure 4:
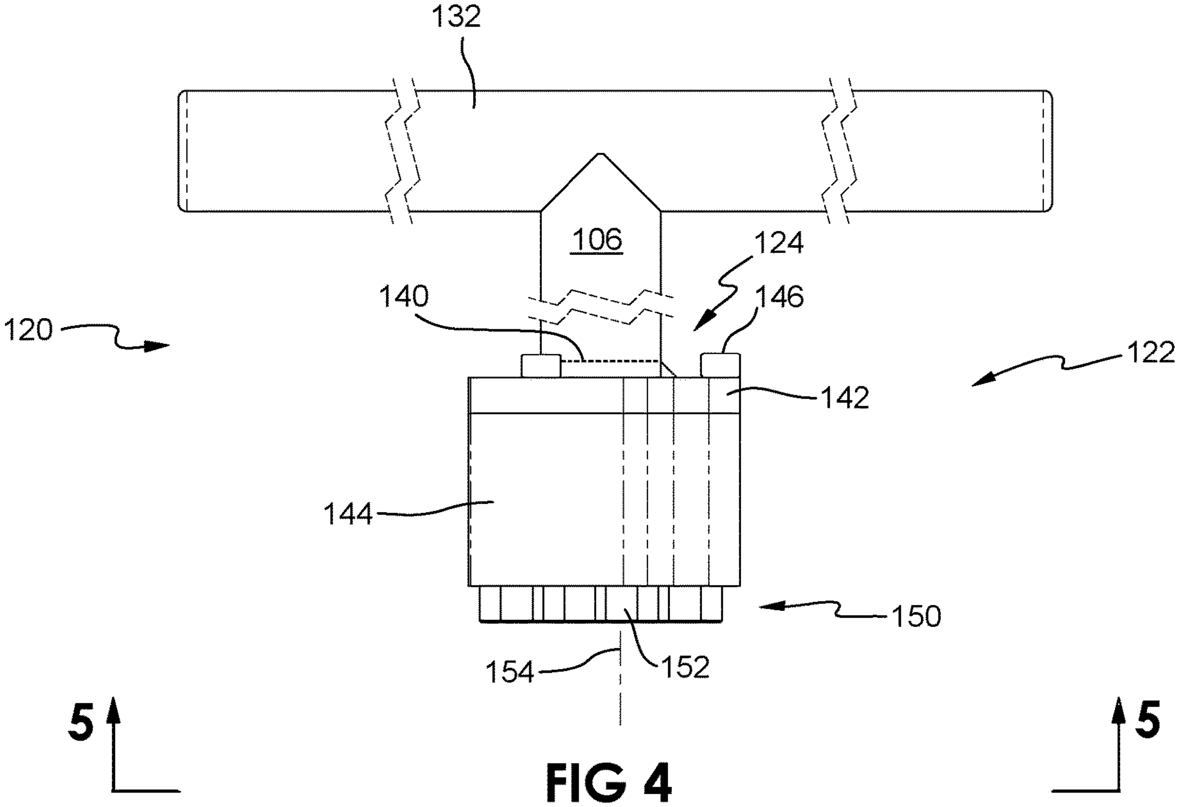
FIG. 4 is a close-up version of an embodiment such as illustrated generally in FIG. 3.

With reference now to FIG. 4, an exemplary attach mechanism 124 includes an optional weld 140, which may be arranged to affix distal end 130 of shaft 106 to the proximal wall 142 of housing 144. Illustrated proximal wall 142 is a removably connected cap or cover that is associated with housing 144 by way of a plurality of fasteners 146. In an alternative case where wall 142 is integral to housing 144, an attach mechanism 124 including weld 140 would be permanent. In the embodiment illustrated in FIG. 4, attach mechanism 124 may also be regarded as being of the permanent type. That is because decoupling shaft 106 (removing wall 142 from the wrench 122), would effectively destroy functionality of the wrench 122.

Figure 5:
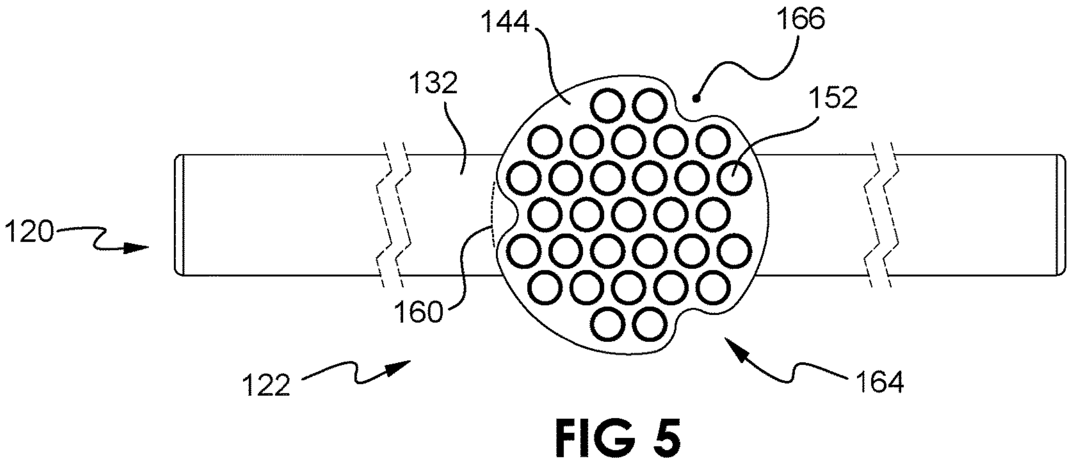
FIG. 5 is the end view from below and indicated by arrows 5-5 in the embodiment illustrated in FIG. 4.
Figure 6:
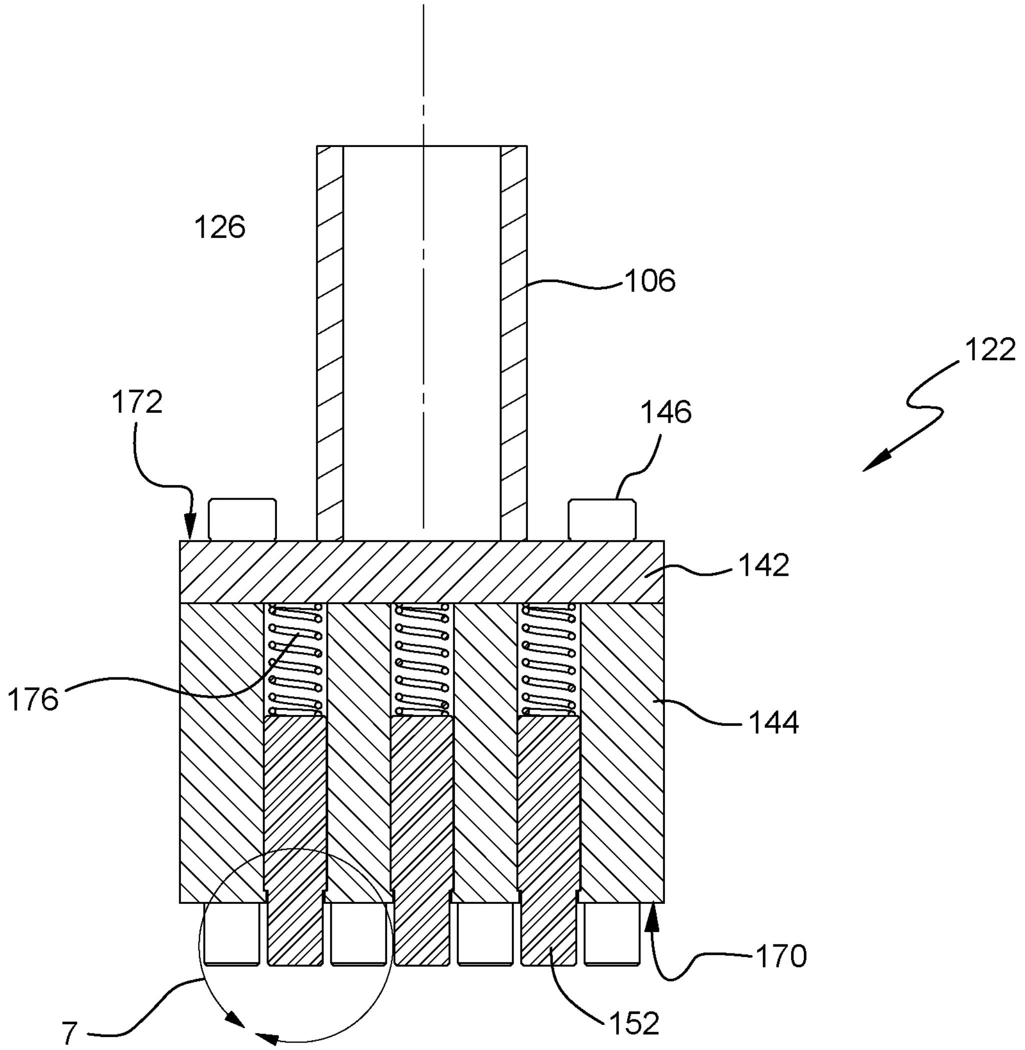
FIG. 6 is a cross-section view taken through a vertical mid-plane of a portion of the embodiment illustrated in FIG. 4.

The wrench 122 illustrated in FIGS. 4 and 5 includes a plurality of reciprocating fingers, generally 150 and individually 152. Other operable wrenches may include only fixed fingers, e.g., that do not retract along a finger length axis 154. Certain wrenches 122 may include a combination of both fixed and reciprocating fingers.

With reference to FIG. 5, a portion of a gage diameter 160 is illustrated in phantom line. Gage diameter 160 is defined as the minimum diameter of a circle through which a housing 144 of an assembled wrench 122 may pass in a distal direction. An assembled housing may carry, or be associated with, one or more projection that must pass also through the gage diameter.

The generally cylindrical housing 144 illustrated in FIGS. 4 and 5 includes a plurality of scallops, generally 164. Each scallop 164 provides a bypass area 166 between the housing 144 and the gage diameter 160. The uninterrupted inner portion of the housing 144 is regarded as forming a blocking cross-section that acts like a cork in a bottle's neck to resist flow of fluid. In contrast, bypass areas 166 provide a flow path for fluid. Consequently, bypass areas 166 are exemplary of anti-stiction structure. Together, bypass areas 166 cooperate to resist stiction of the wrench 122 as the wrench is inserted into, or removed from, an access port 100 having a conventional small diameter.

FIGS. 6-10 illustrate certain details of construction and operation of an exemplary wrench 122 for use in an embodiment such as indicated generally at 120 in FIG. 3. Generally cylindrical housing 144 defines a volume between a distal face 170 and a proximal face 172. A plurality of parallel bores 174 are distributed in the volume to dispose a distal end of each bore 174 as an opening communicating through the front face 170. A finger 152 may be disposed for reciprocation in each bore 174. Desirably, a biasing element 176, such as a compression spring, is arranged to urge a finger 152 in a distal direction.

Illustrated housing 144 includes an integral distal wall (not numbered) associated with distal face 170. The distal wall and proximal wall 142 cooperate to capture a full complement of fingers 150 and biasing elements 176 inside the housing and in registration for reciprocal displacement along respective bore length axes during assembly of the housing 144. It is within contemplation that either of the distal wall and proximal wall 142 (or both) may be embodied as a removable cap.

Figure 7:
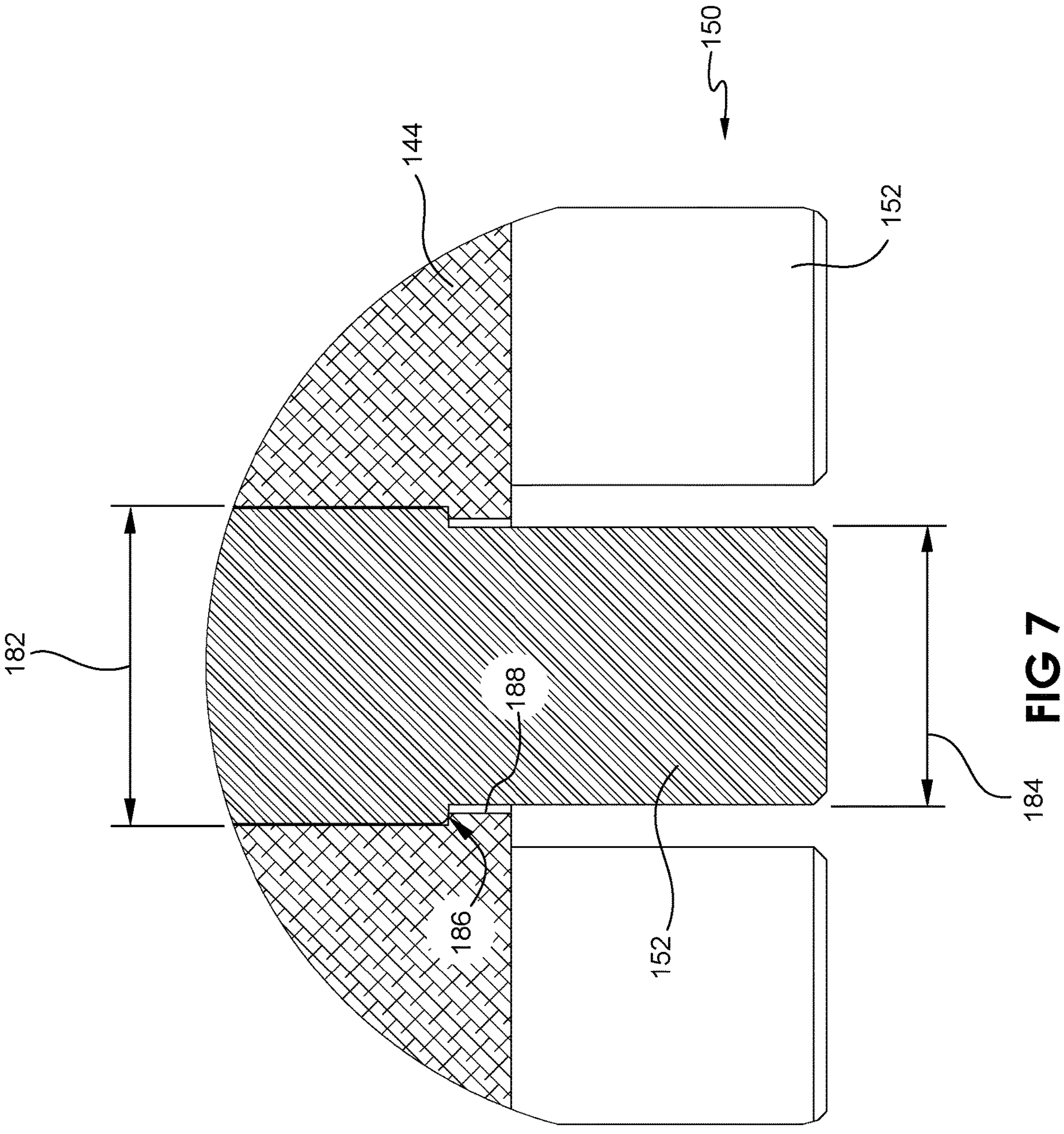
FIG. 7 is a close-up view of the portion indicated by circle 7 in FIG. 6.
Figure 9:
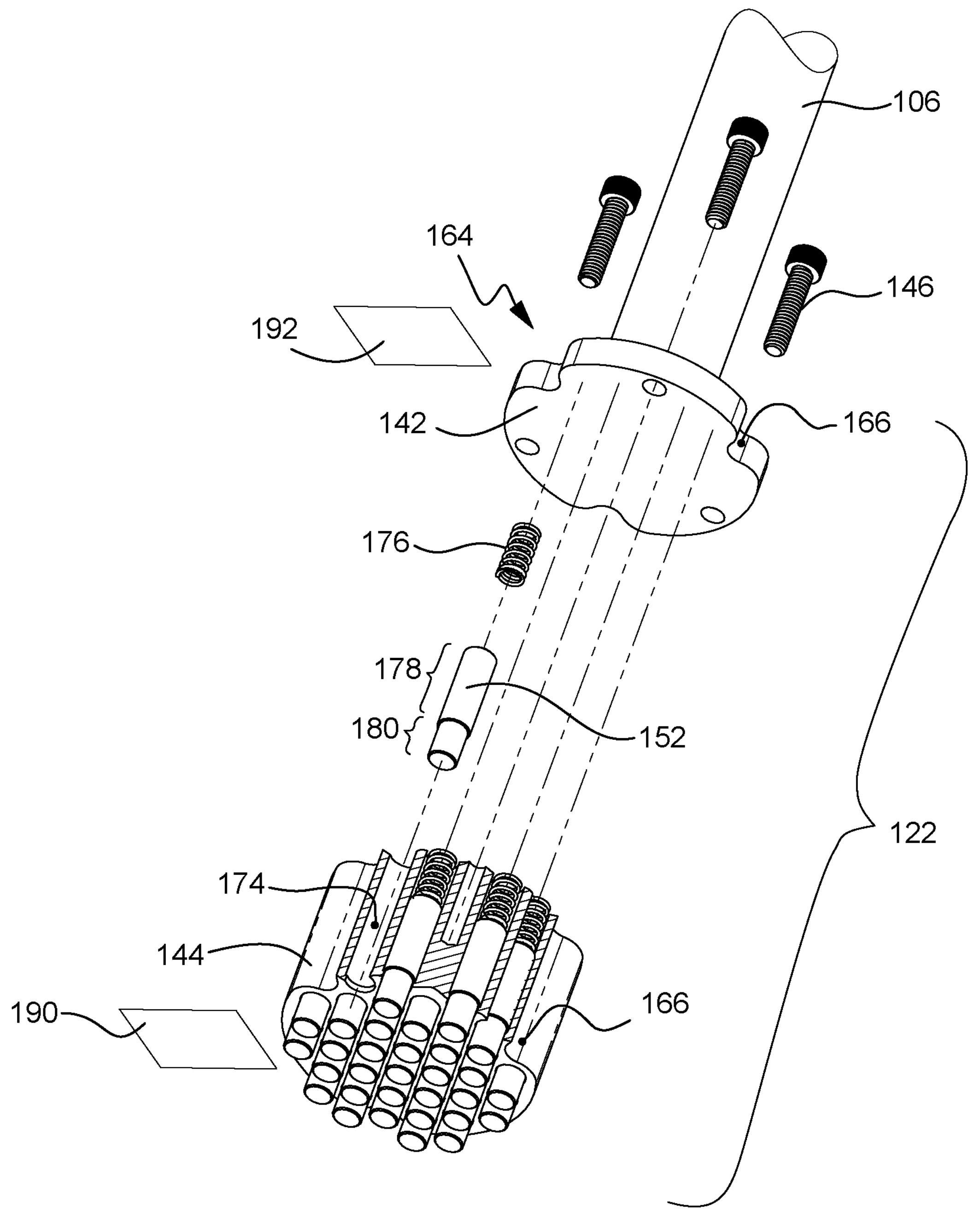
FIG. 9 is a similar exploded assembly view in perspective of a portion of the structure illustrated in FIG. 8.

As best shown in FIG. 9, a finger 152 can include a held portion 178 and a working end 180. Desirably, the working end 180 is configured and arranged to protrude distally be-yond the distal face 170 to a workable extended position. As illustrated in FIG. 7, a workable bore 174 may include a proximal portion with a first diameter 182, and a distal portion with a second diameter 184 that is smaller than the first diameter. A shoulder 186, formed between finger diameters 182 and 184 cooperates with a protrusion 188 in bore 174 to form a structural interference to resist overextension of a finger from the housing 144. That is, a stop element 188 resists displacement of the working end 180 of a finger 152 in a distal direction beyond a desired extended position. With reference to e.g., FIGS. 6 and 7, a plurality of cooperating stop elements 188 may be characterized as providing portions of a distal wall associated with distal face 170 of housing 144. The distal wall and proximal wall 142 capture a full complement of installed fingers and biasing elements inside the housing 144 and in registration for reciprocal displacement along respective bore length axes during assembly of the housing 144.

Figure 10:
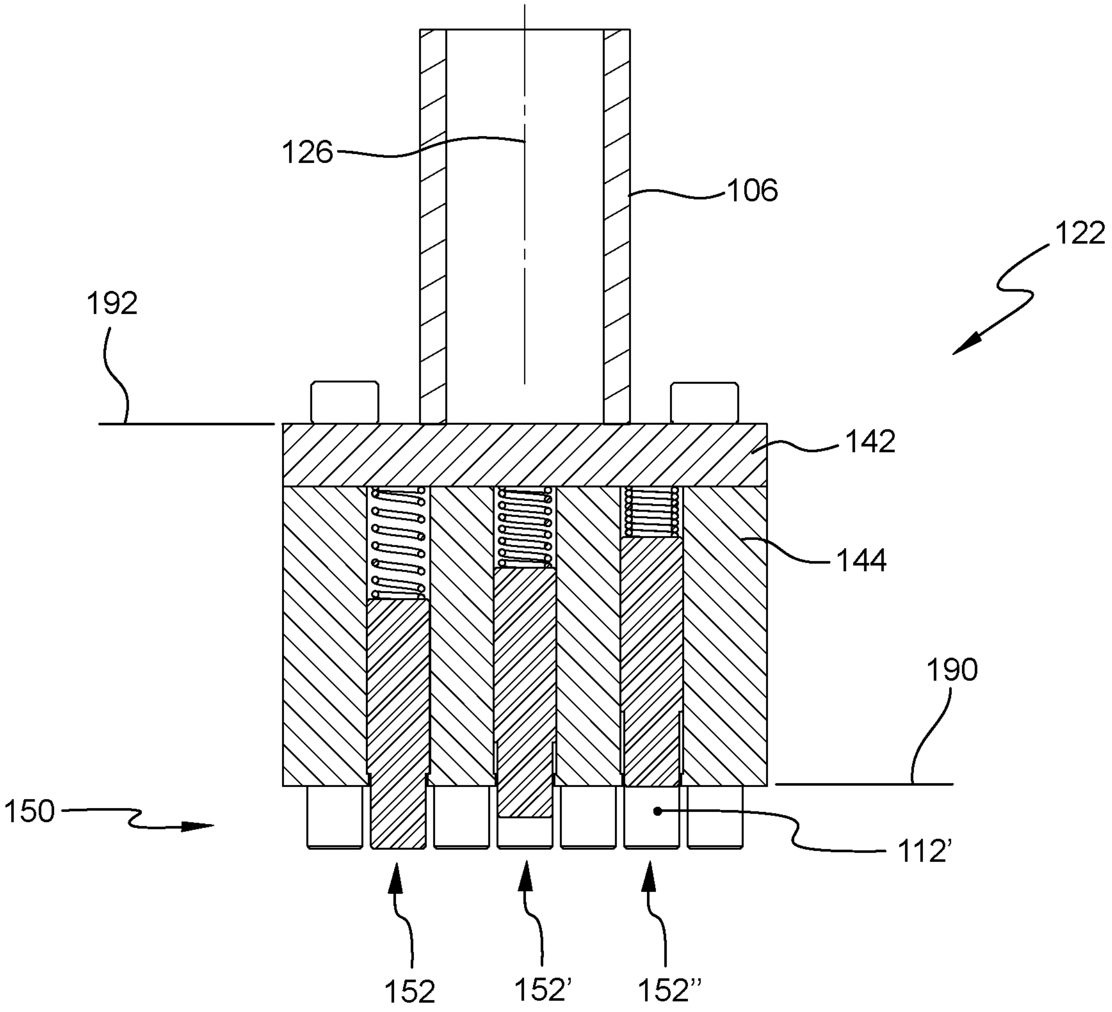
FIG. 10 is a view of structure illustrated in FIG. 6, with pins being illustrated at a variety of operable positions.

As mentioned above, it is desirable that a biased finger 152 will project distally beyond a plane disposed normal to the shaft length axis 126 and containing the most distal portion of a wrench housing 144. As illustrated in FIGS. 9 and 10, a corresponding normally disposed distal plane 190 is parallel with face 170. The entirety of a most distal flat surface 191 (e.g., see FIG. 8) of face 170, which is normal the length axis 126, will reside in plane 190. With particular reference to FIGS. 9 and 10, a proximal plane 192 contains the proximal face of proximal wall 142. In the illustrated embodiment of FIGS. 6-10, planes 190 and 192 are both disposed normal to shaft length axis 126. Because the fingers 150 project distally beyond plane 190, a valve handle can be engaged inside a socket 112' formed between cooperating fingers 150 before encountering a structural interference with a finger side-supporting wall.

Figure 13:
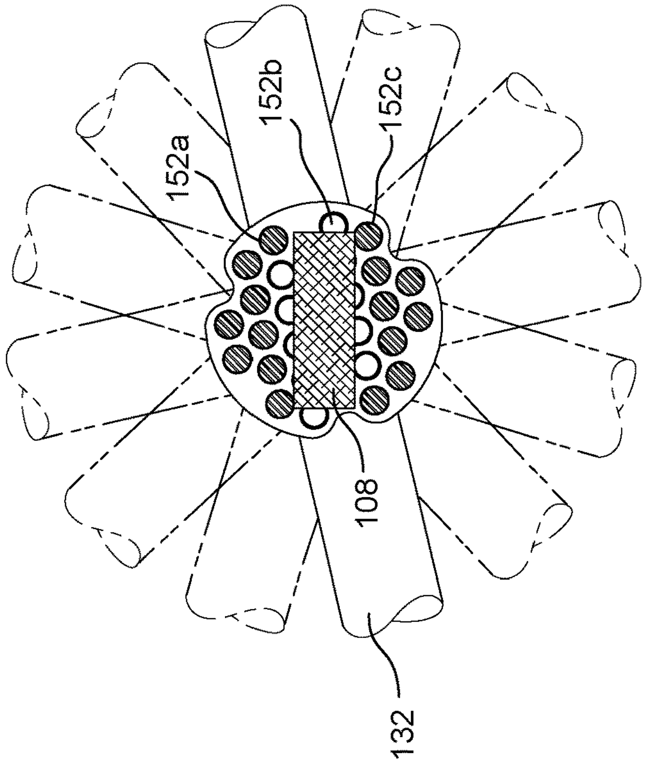
FIG. 13 is the cross-section end view indicated at arrows 13-13 in FIG. 12 and looking in the direction of the arrows.
Figure 30:
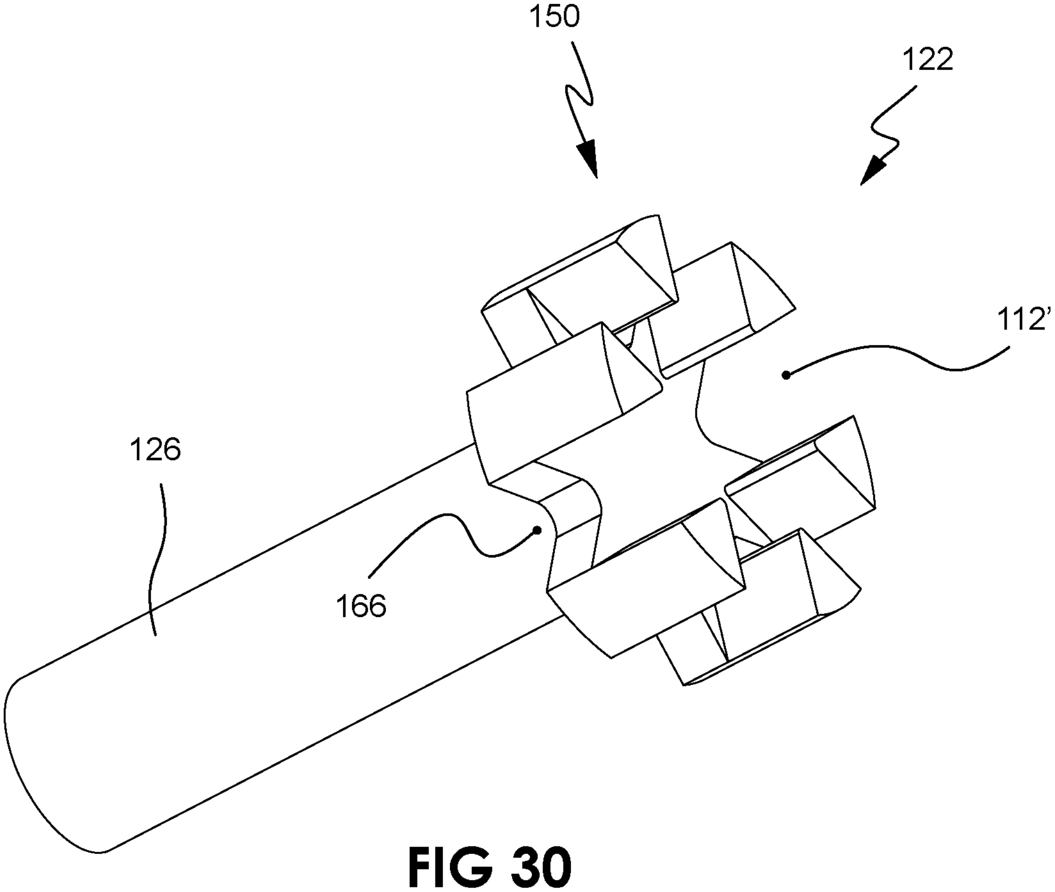
FIG. 30 is a view in perspective of an alternative embodiment.

A socket 112' may be visualized with reference to the embodiments illustrated in FIGS. 10, 13, and 30. As depicted in FIG. 10, a currently preferred wrench 122 includes a plurality of biased fingers 150. Three of the fingers 150 are illustrated in cross-section. Finger 152 is shown in a fully extended position; finger 152' is in an intermediate position; and finger 152" is fully retracted. A temporary socket 112' can be formed in the space vacated by a retracted finger and between the adjacent extended fingers. In FIG. 13, a socket is formed between extended fingers **152*a* and 152*c* by retraction of finger 152*b*. In contrast, FIG. 30 illustrates a wrench 122 having a plurality of three permanent sockets 112'**.

Figure 11:
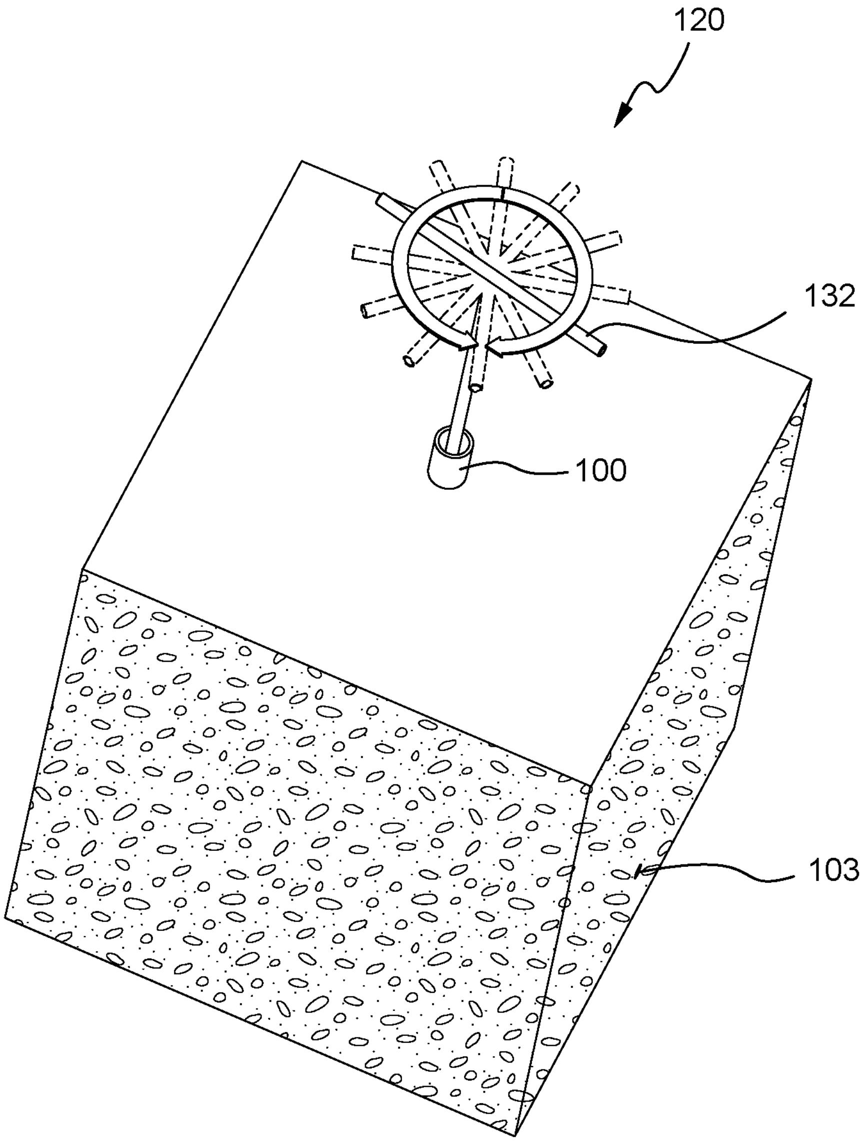
FIG. 11 is a view in perspective from above of a valve actuation tool associated with a valve access port.
Figure 12:
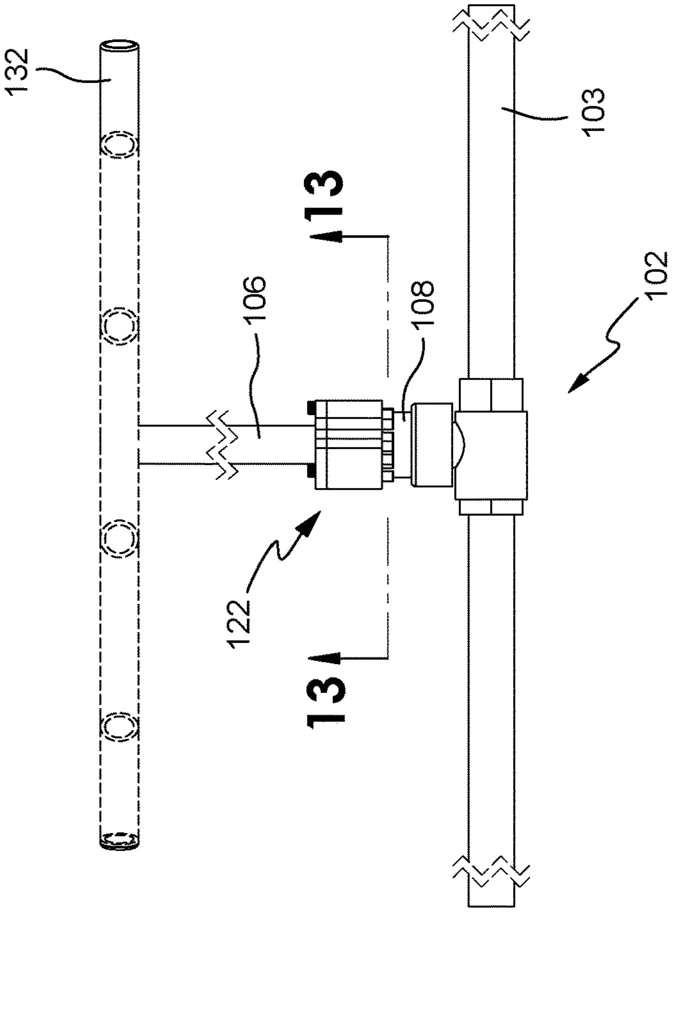
FIG. 12 is a side view in elevation of an embodiment within the ambit of FIG. 3.

With reference to FIG. 11-13, tool 120 is desirably arranged to couple with the actuator handle 108 of a stop and waste valve, generally 102, to variably dispose the lever 132 at a plurality of user perceptible lever orientations clocked at discrete circumferential increments around the shaft length axis 126. A first orientation of lever 132 is indicated in solid line, and a plurality of alternative coupled orientations are indicated in phantom line.

Figure 15:
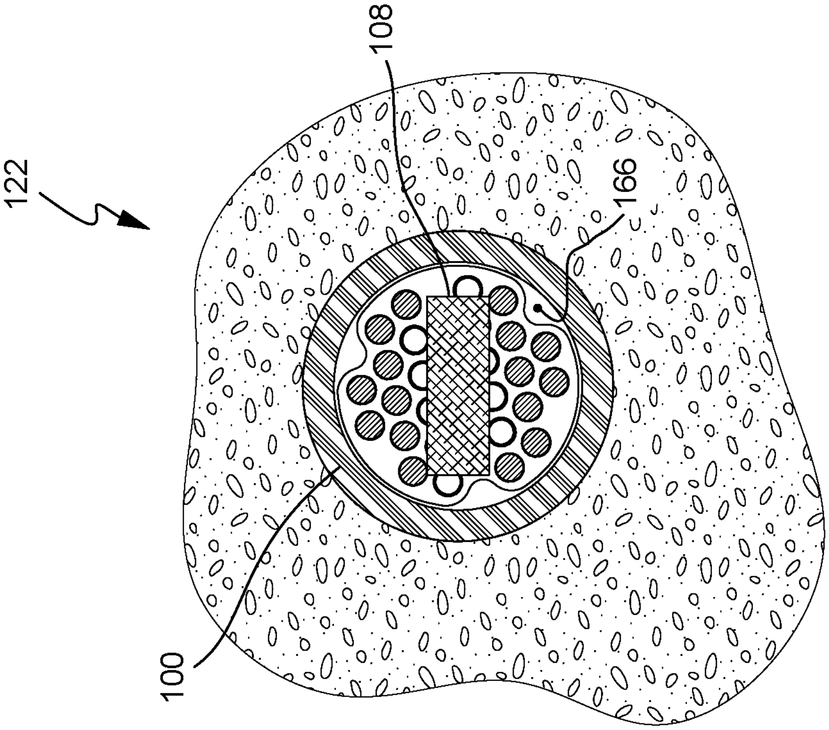
FIG. 15 is a cross-section end view from below, such as would be seen at the section indicated by arrows 13-13 in FIG. 12 and looking in the direction of the arrows, of an embodiment installed in the ground.
Figure 14:
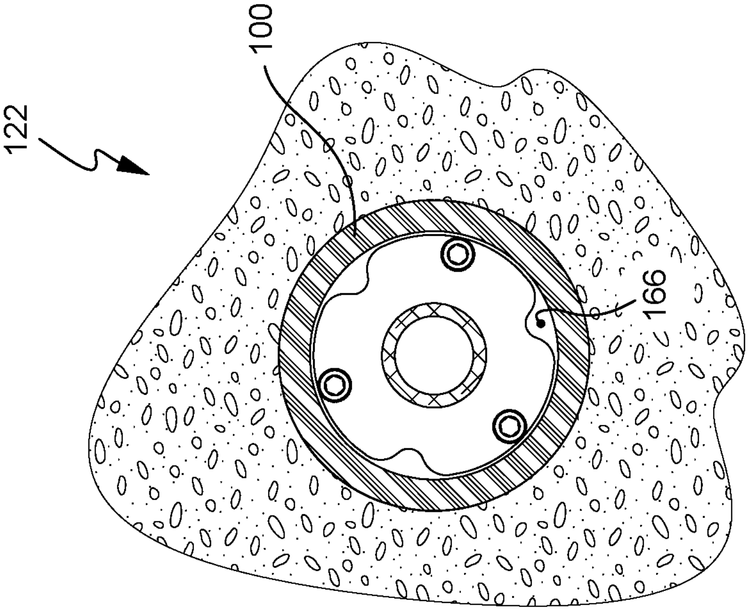
FIG. 14 is a cross-section view from above of a wrench disposed in a two inch diameter access port installed in the ground.
Figure 17:
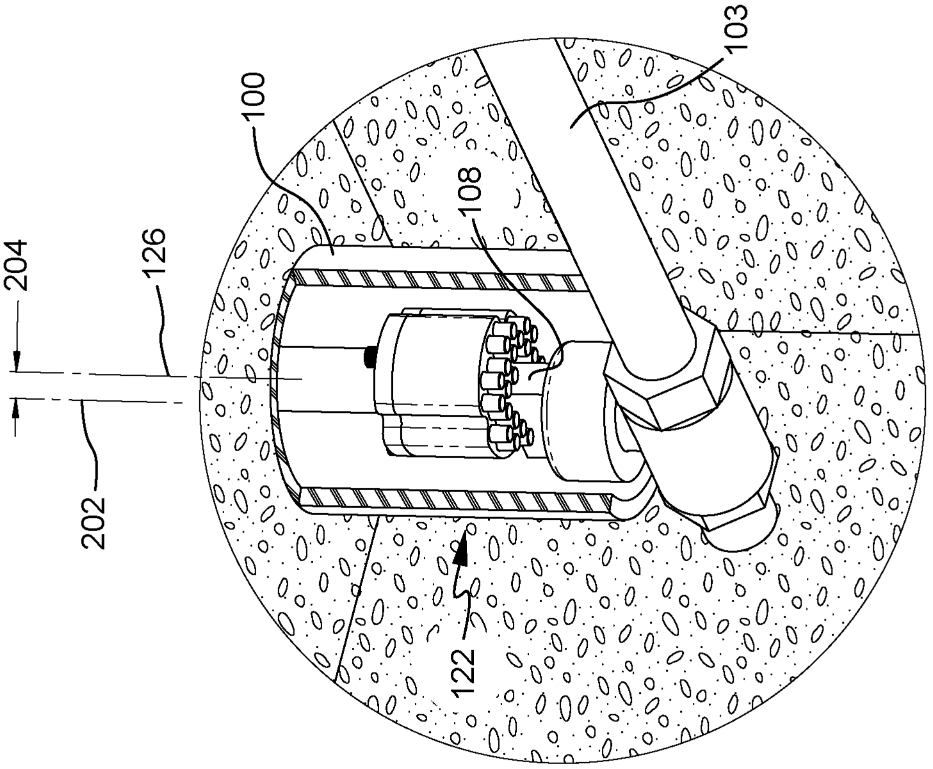
FIGS. 16 and 17 are cut-away views in perspective from below of an embodiment interfacing with centrally and eccentrically disposed valves, respectively.
Figure 16:
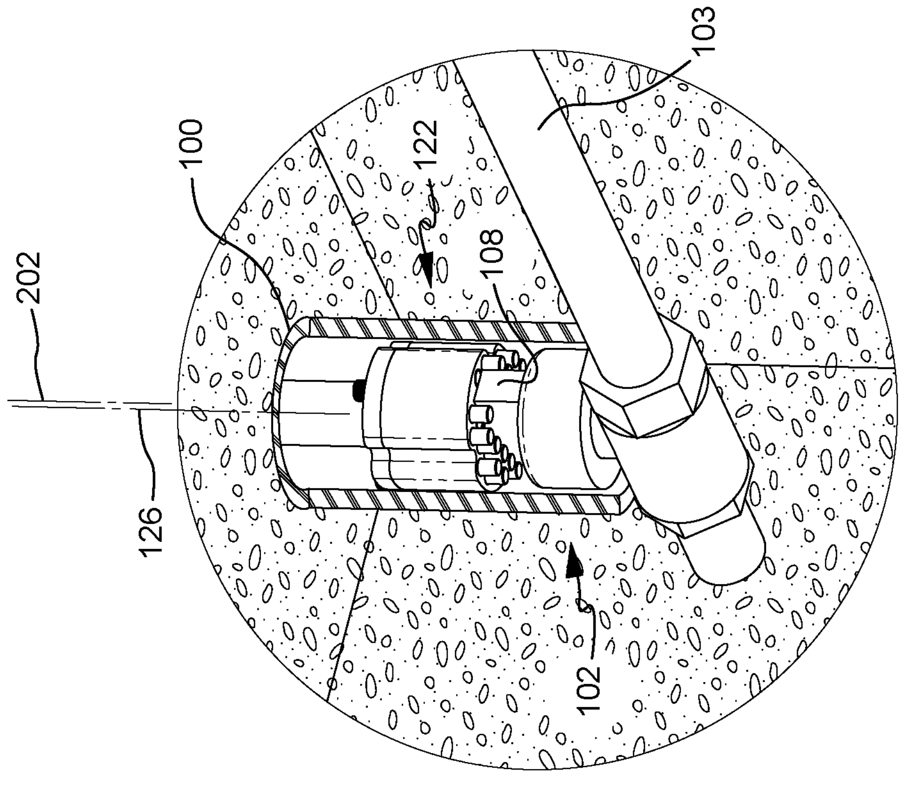

FIGS. 14-16 illustrate views from above, below, and in perspective of a wrench 122 in registration with a handle 108 of a stop and waste valve 102 that is relatively centered in an access port 100 having a conventional small diameter. The wrench's shaft length axis 126 is in close agreement with the rotation axis 202 of the valve 102. Consequently, a socket 112' is formed centrally disposed in the wrench 122. In FIG. 17, the rotation axes 126, 202 are offset by an increment 204. It may be seen by inspection that fingers of the wrench 122 are differently retracted to accommodate the misalignment between axes of rotation, and essentially "move" the socket to operably register the wrench 122 with the valve handle 108.

Figure 18:
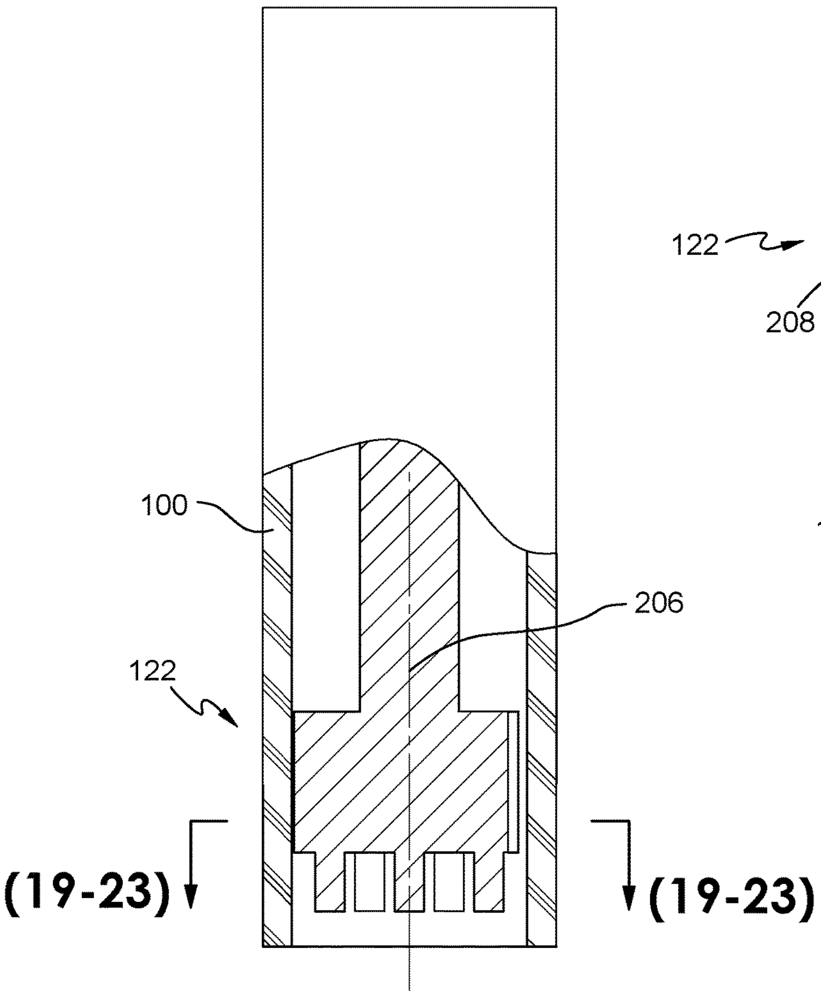
FIG. 18 is a side view in elevation, partially in cross-section, of an embodiment in an access port.

FIG. 18 illustrates a wrench 122 in an access port 100 having a conventional (e.g., small) 2 inch diameter. The cross-section indicated at section (19-23)-(19-23) is shown in FIGS. 19 through 23, respectively, for an assortment of different wrenches 122. A blocking cross-section may be defined as the portion of a wrench cross-section that is sufficiently solid to resist flow of air or fluid in the direction of a wrench length axis 206.

Figure 19:
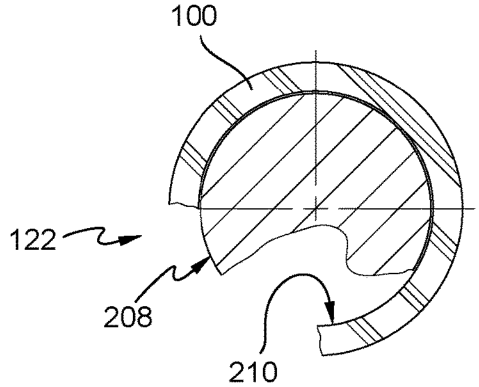
FIGS. 19-23 are cross-section views that show blocking cross-sections of a variety of alternative embodiments taken from the perspective indicated at section 19-23 in FIG. 18, and looking in the direction of the arrows.

FIG. 19 represents a limiting case where a wrench 122 presents a solid circular blocking cross-section sized to dispose its exterior surface 208 spaced apart from the inner surface 210 of port 100 by a minimum amount to permit a slide fit of the wrench in an access port 100. It is believed that for the case of a 2 inch diameter access port 100 having a cross-section area (Aport) of 3.14 $in^2$, a maximum workable blocking cross-section are of a wrench (AWmax) is 3.0 $in^2$. The difference in cross-section areas (Aport—AWmax) may be defined as a minimum bypass area 166. So, the minimum theoretical bypass area 166 is about 0.14 $in^2$. However, although a wrench with that maximum blocking area size may side through a clean dry access port 100 having a 2 inch diameter, the presence of water and mud will cause stiction. Consequently, a realistic workable total bypass area 166 is greater than 0.14 $in^2$.

It is desirable for a wrench 122 to be sized for use in access ports 100 having larger sizes, as well as in access ports having the conventional small 2 inch diameter. A wrench with a larger distal working end can encounter a valve handle of an eccentrically located valve 102 more readily. Consequently, a wrench 122 is desirably large in an operable gage dimension for use in larger access ports. However, stiction inherent in certain wrenches having large blocking cross-section areas cannot be ignored.

Figure 20:
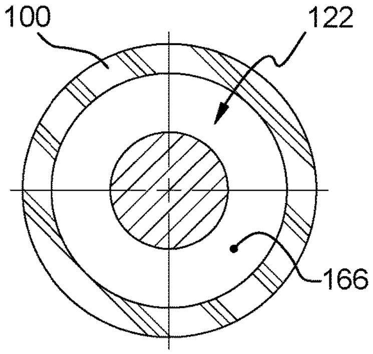

FIG. 20 illustrates a wrench 122 with a circular blocking area believed to constitute the smallest practical compact diameter for use across all the desired variety of port sizes. The blocking area is 1.04 $in^2$ with a 1.15 inch diameter. In a 2 inch diameter access port, its corresponding bypass area 166 is 2.10 $in^2$.

Figure 21:
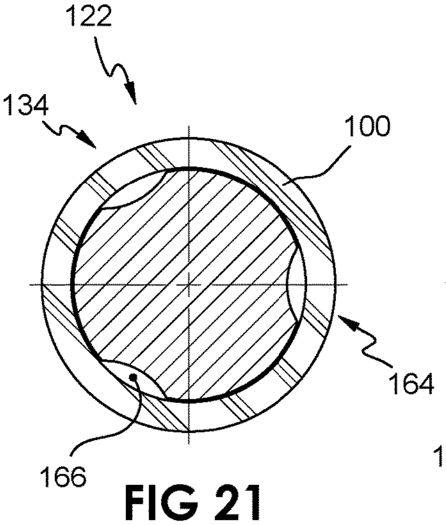
Figure 22:
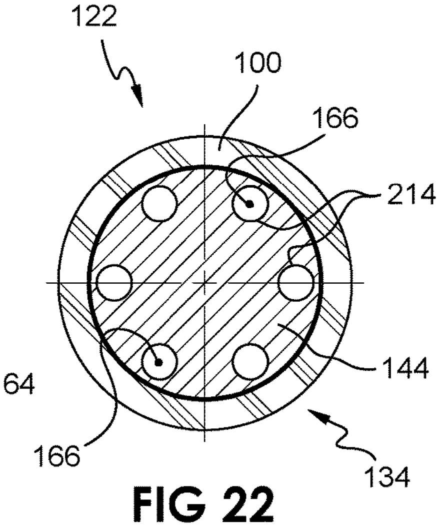

FIG. 21 illustrates a wrench 122 with anti-stiction structure 134 including a plurality of scallops 164 that provide a total bypass area of 0.16 $in^2$. FIG. 22 illustrates a wrench 122 with anti-stiction structure 134 including a plurality of conduits extending along a wrench length axis. Each such conduit provides a bypass area 166. The illustrated embodiment of FIG. 22 provides a total bypass area of 0.412 $in^2$. A conduit 214 is disposed in an interior of the housing. That is, a conduit 214 is spaced apart from a perimeter of the housing, and is distinguished over a scallop 164.

Figure 23:
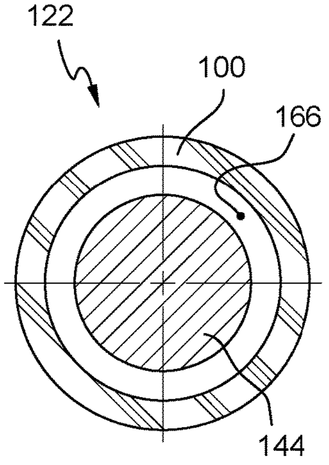

As illustrated in FIG. 23, if the gauge diameter of a housing 144 is equal to the blocking diameter, there is no anti-stiction structure present. It is recognized that a round housing 144 of an appropriate diameter may resist formation of stiction by providing a sufficient bypass area 166. However, it is believed that the requisite smaller diameter housing undesirably compromises the arrangement of fingers required for a preferred embodiment.

Figure 8:
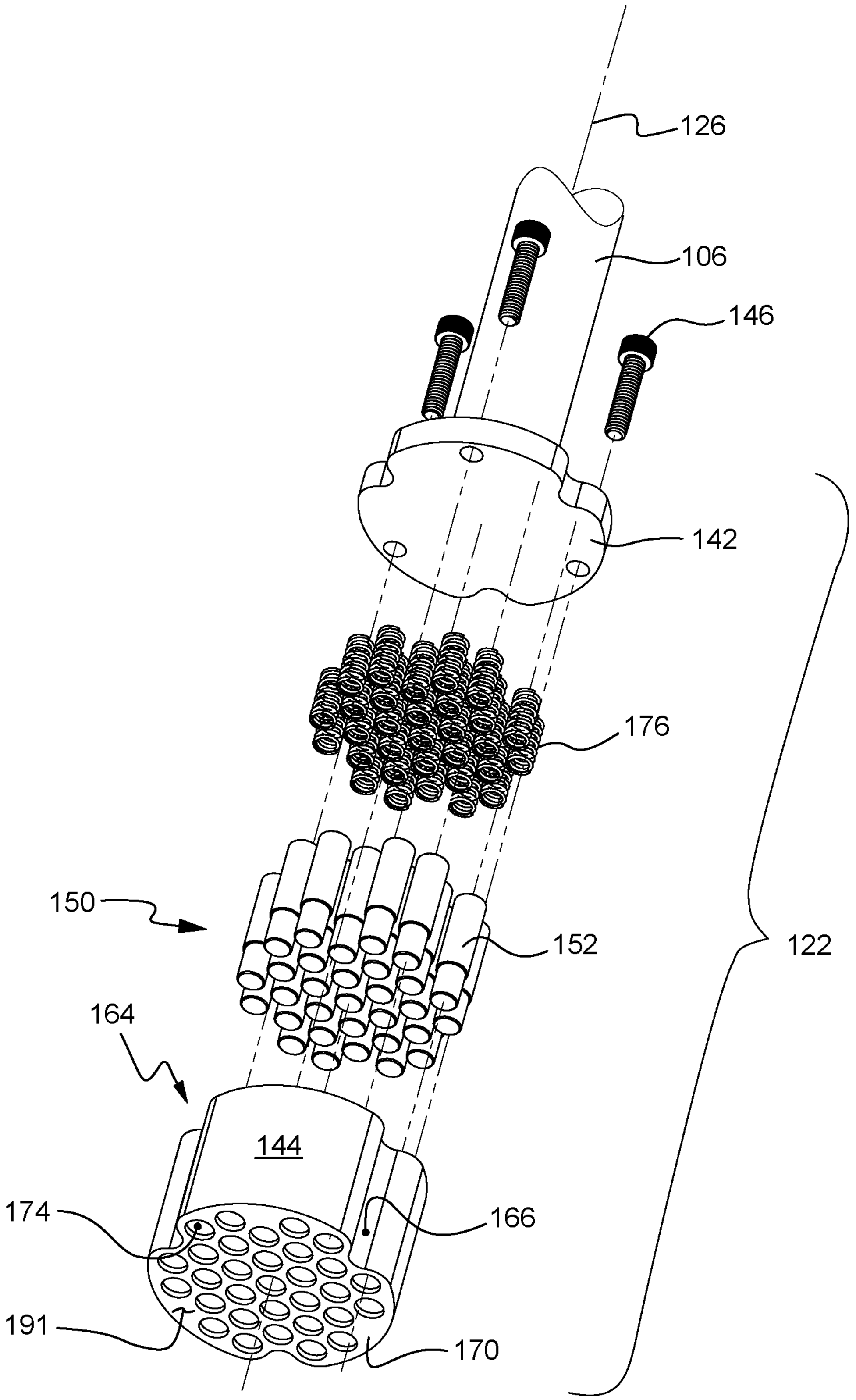
FIG. 8 is an exploded assembly view in perspective of a portion of the embodiment illustrated in FIG. 4.

FIGS. 24-33 illustrate exemplary alternative wrenches 122 that may be used in embodiment 120 of FIG. 3. A wrench 122 according to certain principles of the instant invention may be configured in a plurality of different workable arrangements. FIGS. 24-29 illustrate wrenches 122 each having a plurality of retractable fingers 152 that are adjacent one another. In that case, fingers can cooperate together to resist side loads required to actuate a valve handle. In contrast, fingers 150 of the wrench 122 illustrated in e.g., FIGS. 8 and 9 are radially spaced apart so that side loads are carried by individual fingers. That is, bores 174 are spread out in an array to dispose adjacent fingers in a spaced apart relationship to resist transverse load transfer from one load carrying finger to an adjacent finger.

Figure 25:
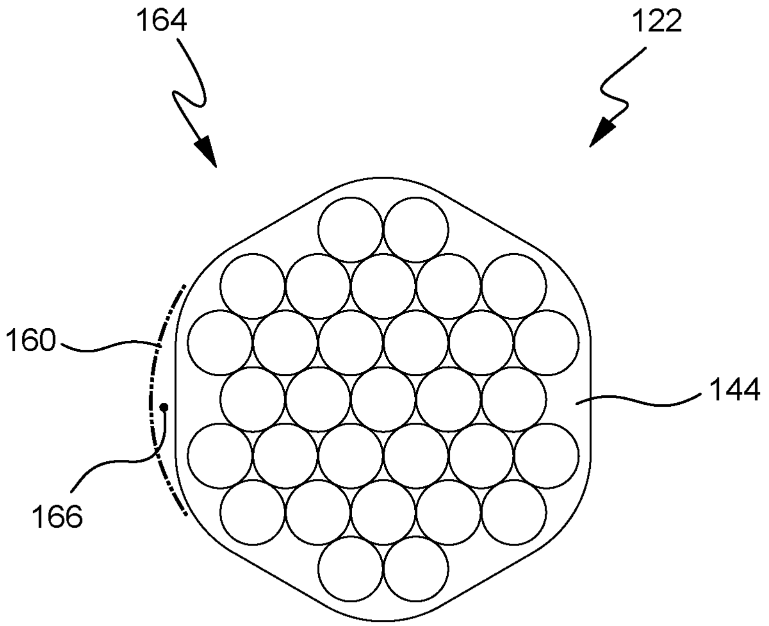
FIG. 25 is an end view of the embodiment in FIG. 24.
Figure 24:
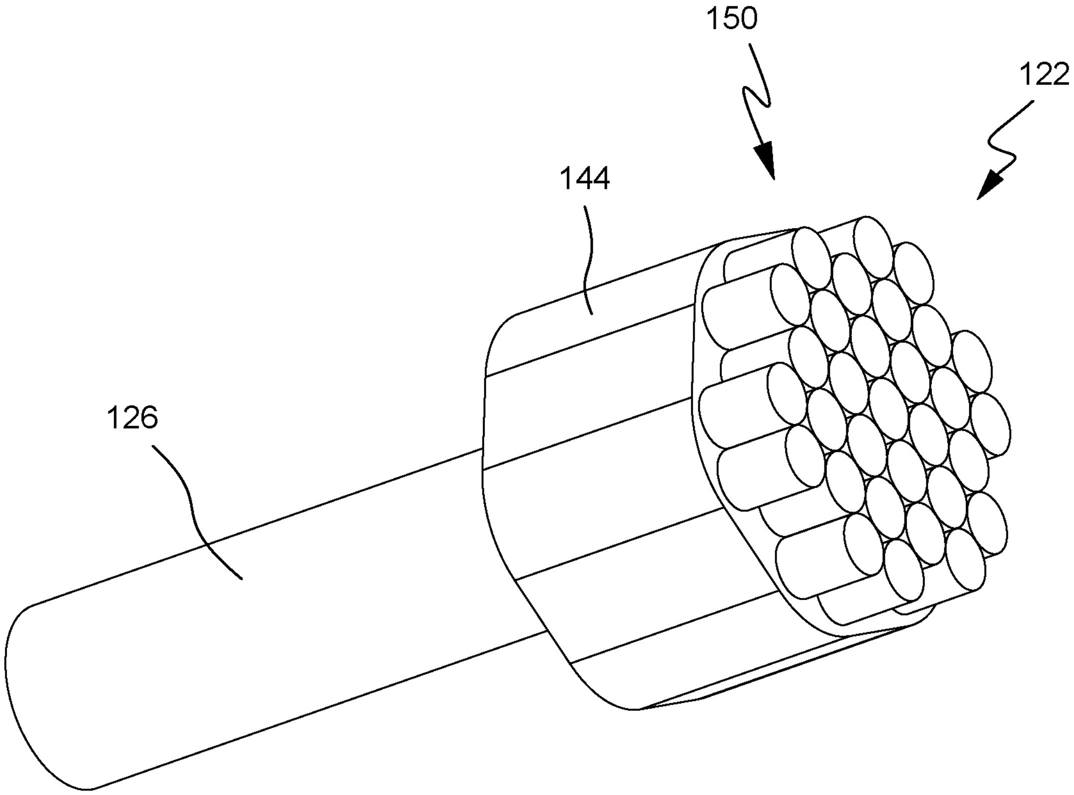
FIG. 24 is a view in perspective of an alternative embodiment.
Figure 27:
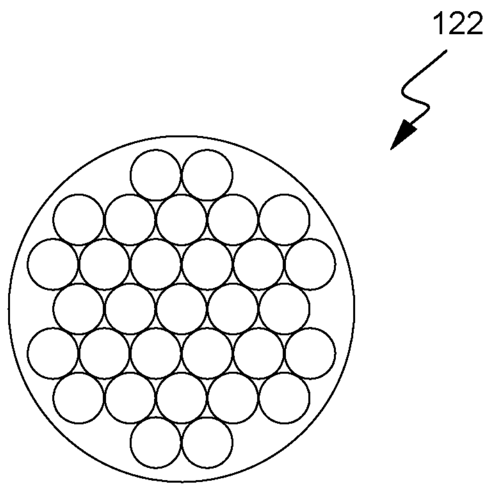
FIG. 27 is an end view of the embodiment in FIG. 26.
Figure 26:
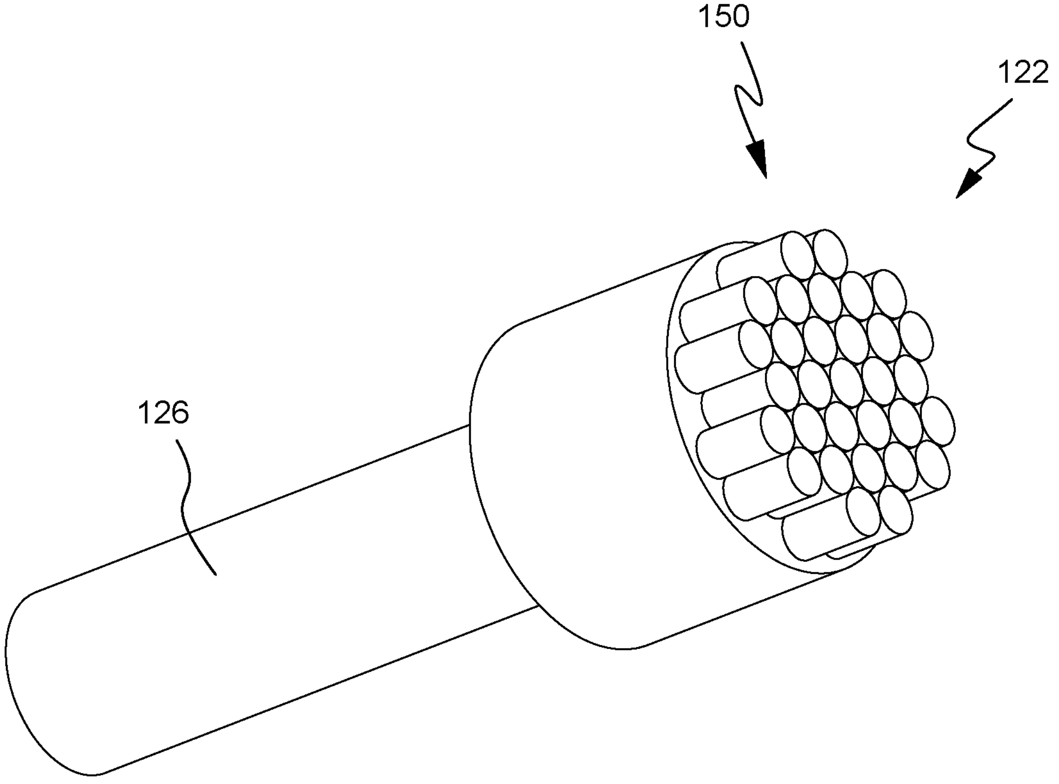
FIG. 26 is a view in perspective of an alternative embodiment.
Figure 29:
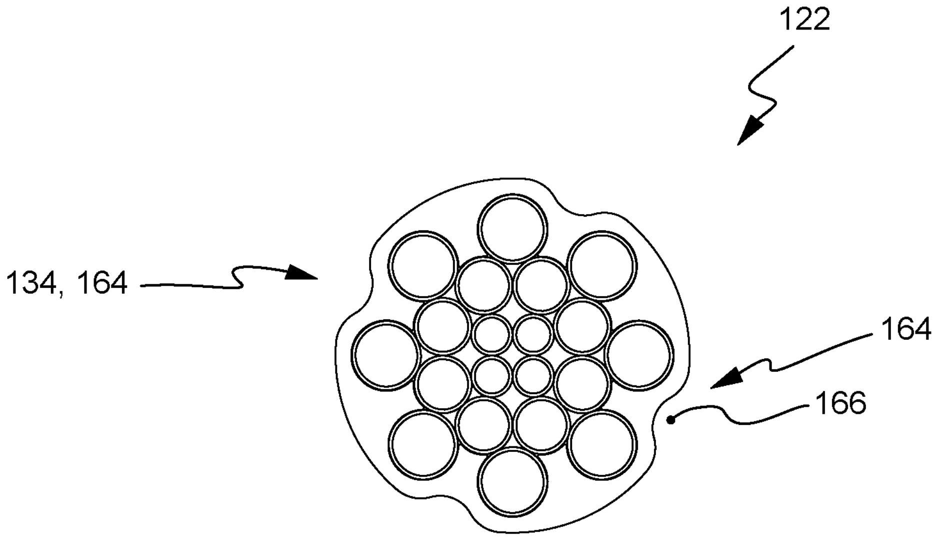
FIG. 29 is an end view of the embodiment in FIG. 28.
Figure 28:
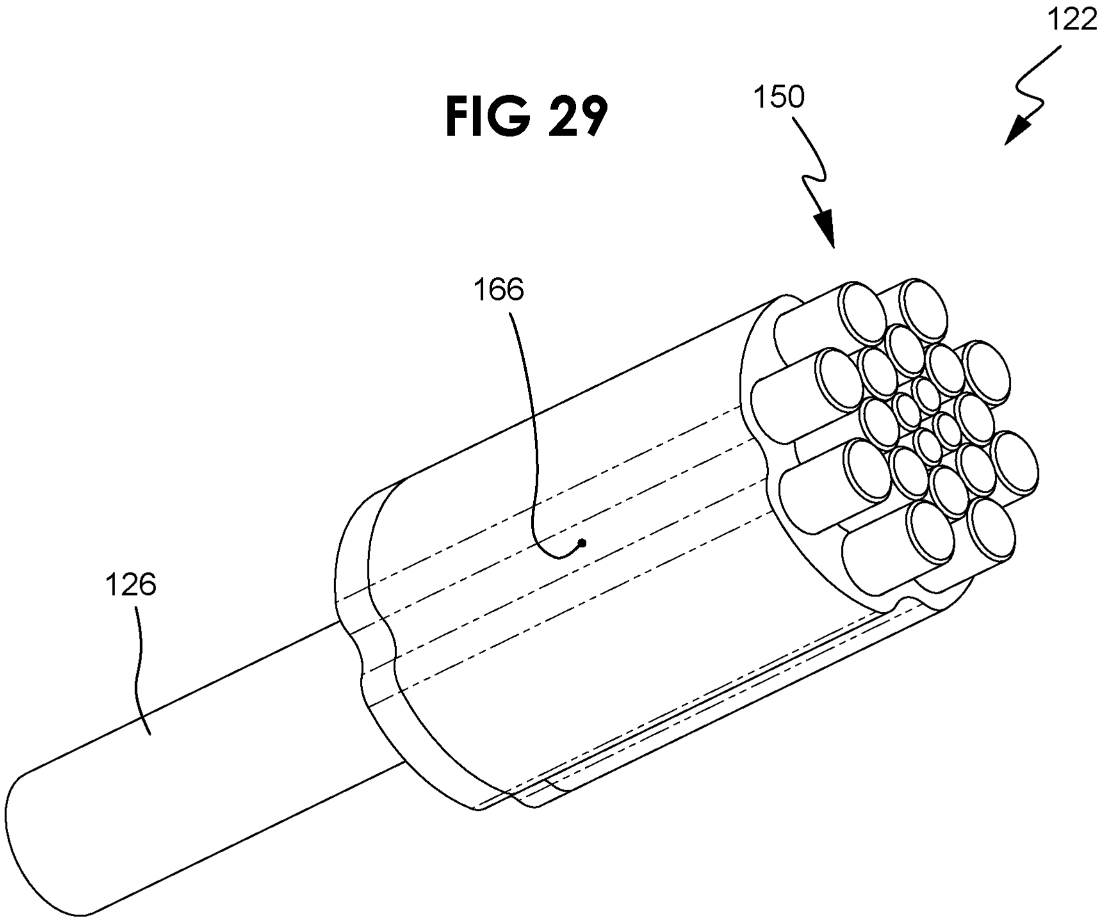
FIG. 28 is a view in perspective of an alternative embodiment.
Figure 31:
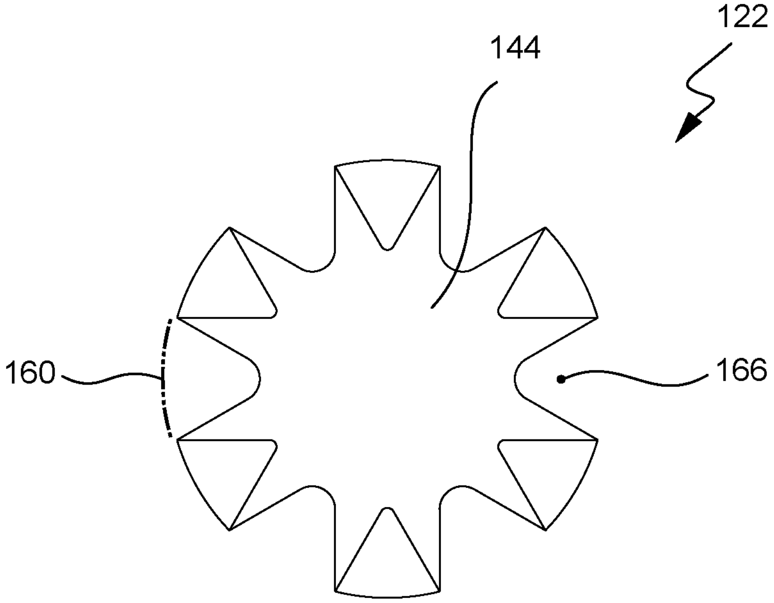
FIG. 31 is an end view of the embodiment in FIG. 30.
Figure 33:
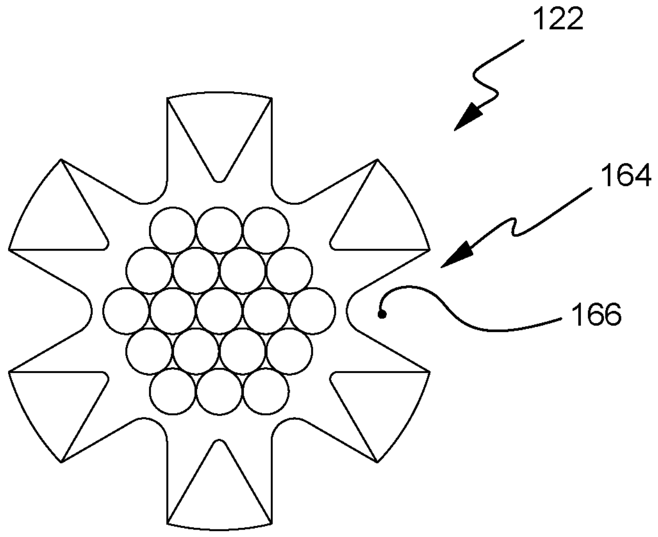
FIG. 33 is an end view of the embodiment in FIG. 32.
Figure 32:
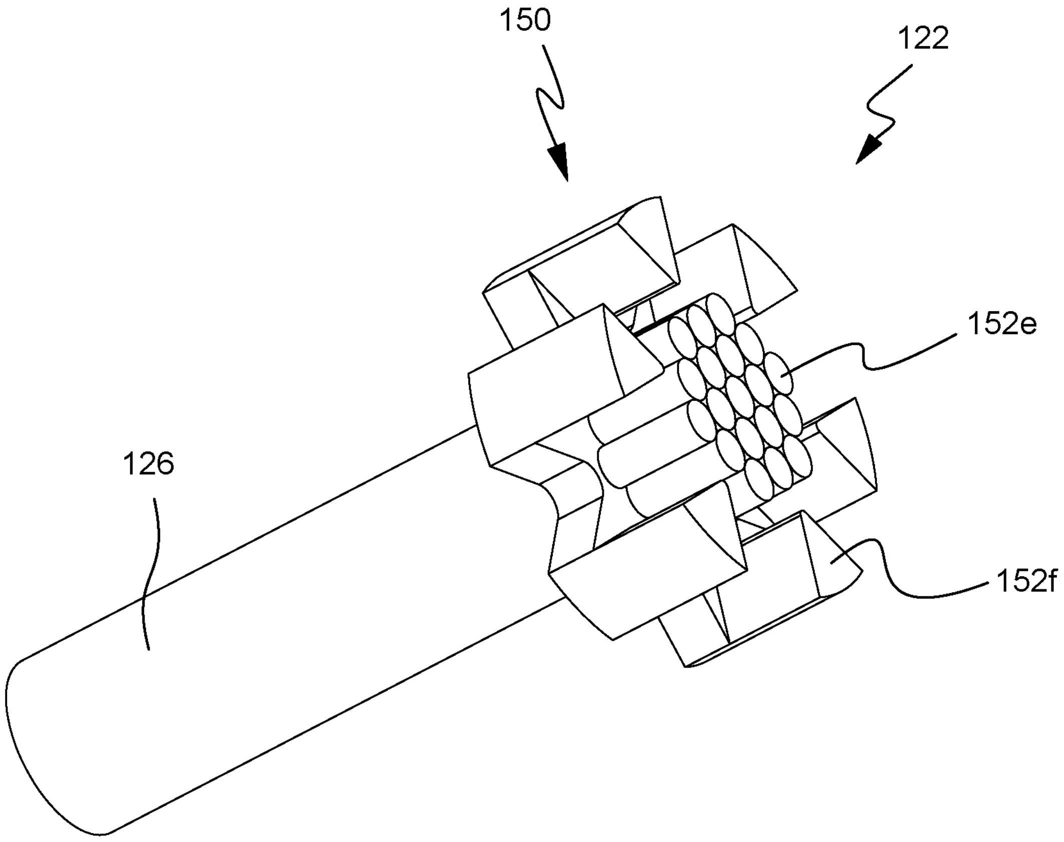
FIG. 32 is a view in perspective of an alternative embodiment.
Figure 36:
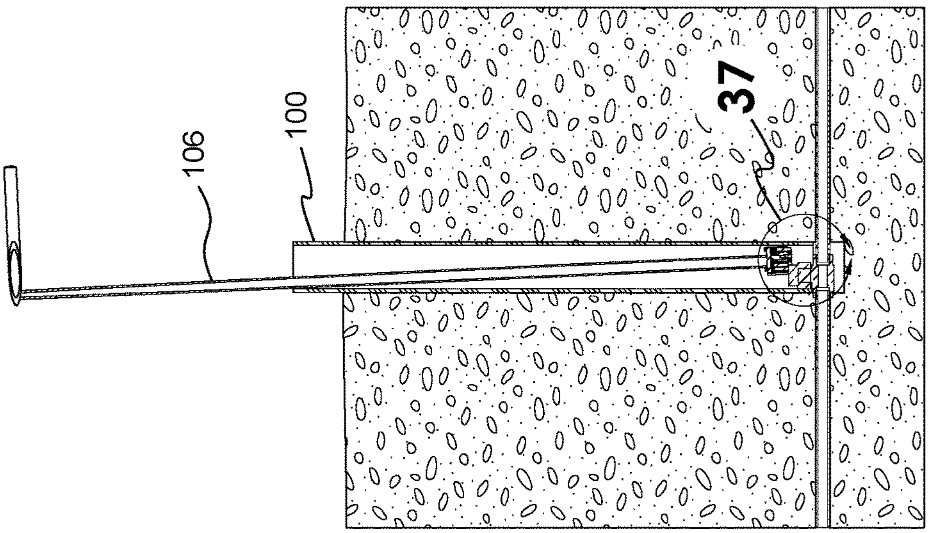
FIG. 36 is a side view in elevation of a cross-section of the embodiment in FIG. 34.
Figure 34:
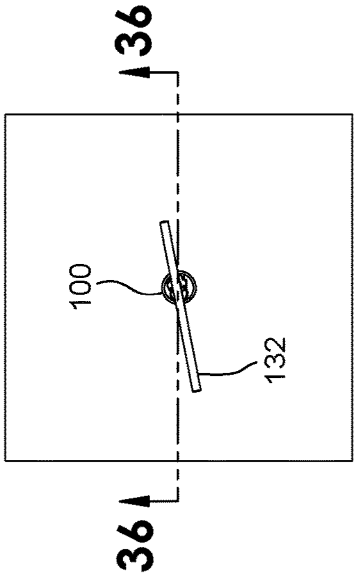
FIG. 34 is a top view of an embodiment in working registration with a stop and waste valve inside a three inch diameter access port in the ground.
Figure 35:
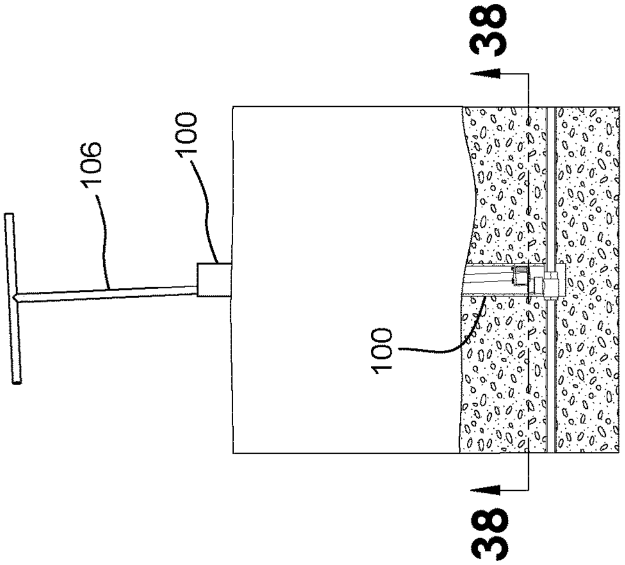
FIG. 35 is a side view in elevation, partially in cross-section, of the embodiment in FIG. 34.
Figure 38:
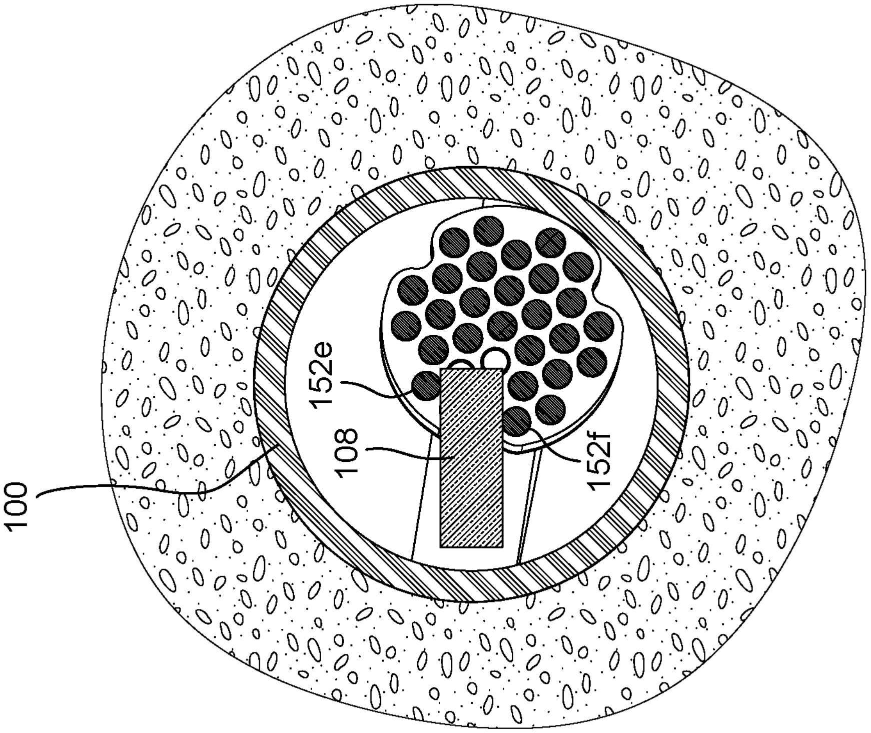
FIG. 38 is the end view indicated at section 38-38 in the embodiment of FIG. 35 and looking in the direction of the arrows.

As illustrated in FIGS. 24 and 25, a workable housing may be non-cylindrical. With reference to FIGS. 28-31, fingers may be non-uniform (e.g., different size cross-sections), and may include any cross-section desired to accomplish a particular result or form an esthetic or artistic appearance. Note that in FIGS. 30 and 31, fingers 150 are of the "fixed" variety, and are arranged to form three sockets 112'. Further, a housing 144 may be embodied as a solid, sometimes planar, substrate that is workable to hold a finger element. Preferably, one or more bypass areas 166 are provided as anti-stiction structure. As shown in FIGS. 32 and 33, a workable wrench 122 may include both retractable and fixed fingers (e.g., pointed out by **152*e* and 152*f***, respectively).

Figure 37:
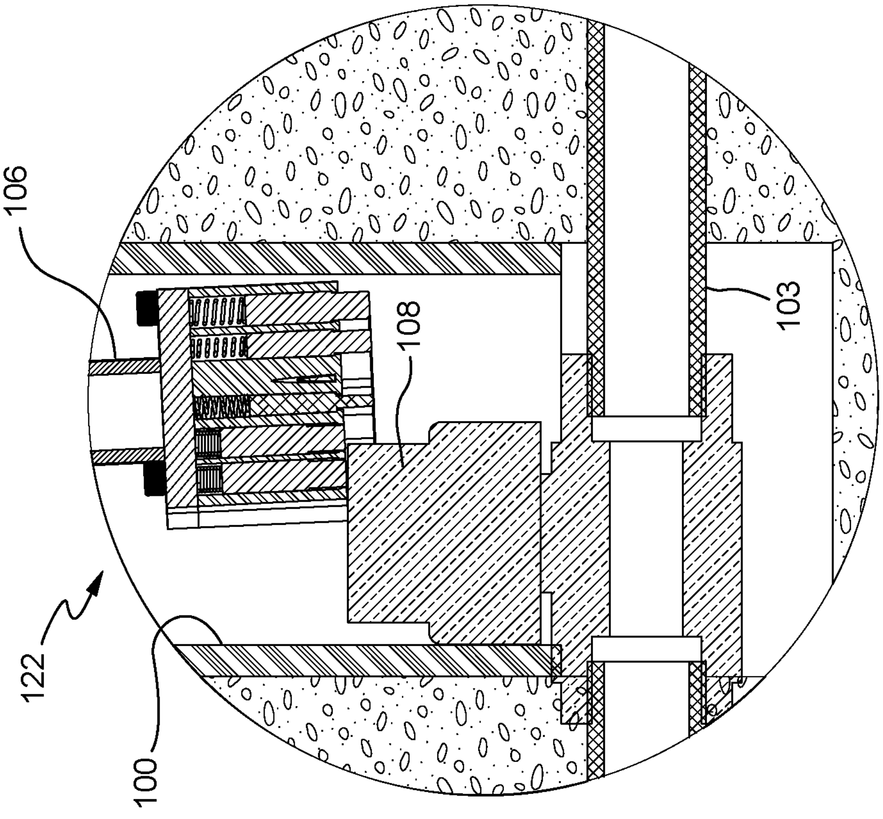
FIG. 37 is a close-up view of the portion indicated by circle 37 in FIG. 36.

FIGS. 34-38 illustrate use of a tool according to certain principles of the invention to actuate a stop and waste valve 102 that is installed in a large diameter access port 100. Embodiment according to certain principles of the invention are operable even without good parallel alignment of the wrench shaft axis of rotation 126 and the rotation axis of the valve handle. As can be seen in FIGS. 37 and 238, a wrench 122 may eccentrically engage the handle 108 of a stop and waste valve. In the illustrated case, handle 108 may be operably engaged for rotation by as few as a single pair of fingers **152*e* and 152*f***.

Figure 40:
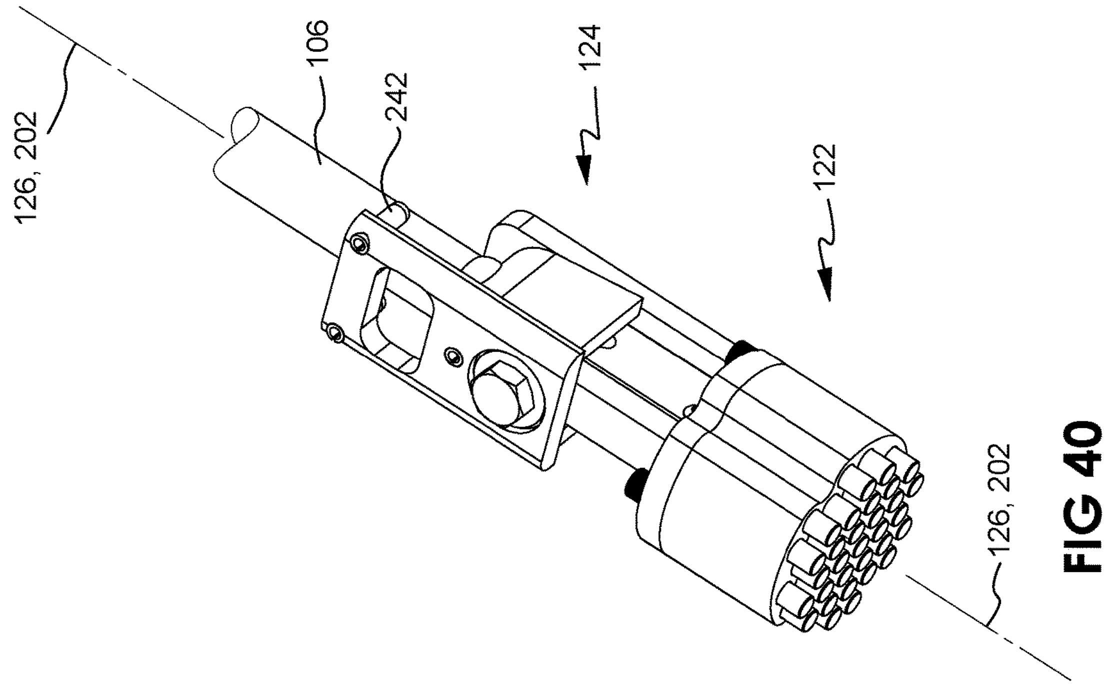
FIG. 40 is view in perspective of the embodiment in FIG. 39, in assembled condition.
Figure 39:
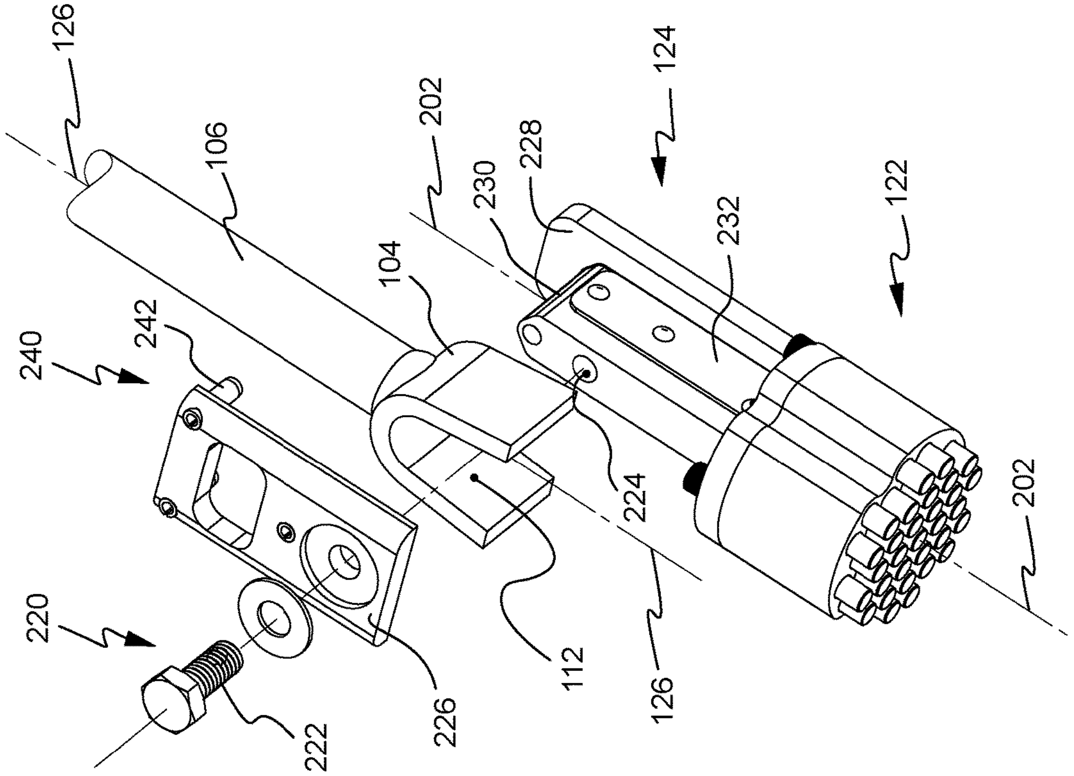
FIG. 39 is an exploded assembly view in perspective of a workable attachment mechanism.

A currently preferred attachment mechanism 124 is illustrated in FIGS. 39 and 40. A primary coupling mechanism is generally indicated at 220. Primary coupling mechanism 220 includes threaded a fastener 222 that is received in threaded hole 224. A primary coupling mechanism 230 is indicated generally at 220 in FIGS. 39 and 40, and functions to associate a wrench 122 with a prior art shaft 106. Coupling mechanism 220 includes fastener 222 received in threaded hole 224 to trap a prior art wrench 104 between plate 226 and flange 228. A preferred trapping arrangement also exerts a clamping force to resist rattling. Further, filler 230 is engaged in socket 112 to assist in enforcement of axial alignment between shaft axis 126 and desired wrench axis 202. One or more optional cooperating spacer plate 232 may be included to reduce any side-slop in a socket 112. Flat surfaces of plate 226 and flange 230 contact parallel flat surfaces of the wrench 104, and also cooperate to align axes 126 and 202.

It is currently preferred to provide a supplemental mechanism, or safety coupling mechanism, generally 240. An operable safety mechanism 240 can resist disengagement of a wrench 122 from a shaft 106 in the event that primary mechanism 220 fails. Safety mechanism 240 includes a pair of pins 242 that straddle the shaft 106, and form an interference with wrench 104 to resist displacement of plate 226 in a distal direction along shaft 106. In one alternative arrangement within contemplation, pins 242 may be replaced with a U-bolt. In any case, the pins 242 also assist in encouraging axial alignment of axes 126 and 202.

Note that complete alignment of axis 126 and axis 202 is not required. There is actually a fair amount of misalignment from colinearity (maybe, ½ to 1 inch, or so) that is tolerable. However, it is preferred that the rotation axes 126, 202 are at least approximately parallel.

While aspects of the invention have been described in particular with reference to certain illustrated embodiments, such is not intended to limit the scope of the invention. The present invention may be embodied in other specific forms without departing from its spirit or essential characteristics. For one example, one or more element may be extracted from one described or illustrated embodiment and used separately or in combination with one or more element extracted from one or more other described or illustrated embodiments, or in combination with other known structure. The described embodiments are to be considered as illustrative and not restrictive. Obvious changes within the capability of one of ordinary skill are encompassed within the present invention.

Therefore, the invention for which a monopoly position is currently desired is indicated by the appended claims rather than by the foregoing description. All changes which come within the meaning and range of equivalency of the claims are to be embraced within their scope.

What is claimed is:

1. An apparatus, comprising:

a shaft extending in a shaft length axis direction between proximal and distal shaft ends, the shaft having a length in excess of about three feet;

a lever associated with the shaft to apply a torque to the shaft at a location spaced apart from the distal shaft end;

a wrench comprising: a housing defining a volume between a distal face and a proximal face;

a plurality of parallel bores distributed in the volume to dispose a distal end of each bore as an opening communicating through the distal face;

a plurality of fingers, at least one finger of the fingers comprising a working end and a held portion, the working end being configured and arranged to protrude distally beyond the distal face to a desired extended position, the held portion to fit in registration inside one of the bores for reciprocal displacement parallel to a bore length axis;

a plurality of stop elements, at least one stop element of the stop elements to resist displacement of the working end of the at least one finger in a distal direction beyond the desired extended position; and a plurality of biasing elements, at least one biasing element of the biasing elements to urge motion of the at least one finger in a distal direction, wherein:

the at least one finger comprises a cylindrical held portion having a first diameter and a cylindrical working end having a second diameter, the first diameter being greater than the second diameter, a first shoulder disposed between the first diameter and the second diameter; and the at least one stop element comprises a protrusion disposed in one of the bores to form a structural interference between the first shoulder and the protrusion; and the housing comprises a distal wall associated with the distal face and a proximal wall associated with the proximal face, the distal and proximal walls to capture a full complement of installed fingers and biasing elements inside the housing and in registration for reciprocal displacement along respective bore length axes during assembly of the housing; wherein:

the bores are arrayed to dispose distal ends of adjacent fingers in a spaced apart relationship to resist transverse load transfer from a load-carrying finger to an adjacent finger; and a distal wrench end configured and arranged to variably couple with a handle of a stop and waste valve to variably dispose the lever at a corresponding plurality of user perceptible lever orientations clocked at discrete increments about the shaft length axis; and an attachment mechanism configured to couple the wrench in operable association with the distal shaft end.

2. The apparatus according to claim 1, wherein:

the attachment mechanism is structured to permit removal of the wrench from engagement with the shaft.

3. The apparatus according to claim 1, wherein:

the fingers normally protrude in a distal direction beyond a plane disposed normal to the length axis and containing a portion of a distal end of the wrench housing.

4. The apparatus according to claim 3, wherein:

at least one of the fingers is biased toward a normally extended position.

5. The apparatus according to claim 1, further comprising:

anti-stiction structure operably associated with a blocking area of the wrench to facilitate insertion and retraction of the wrench into, and out of, a stop and waste valve access port having a two inch inside diameter.

6. The apparatus according to claim 5, wherein:

the anti-stiction structure comprises a bypass area between a blocking cross-section area of the wrench and an open cross-section of the access port, the bypass area being greater than 0.14 square inches.

7. The apparatus according to claim 5, wherein:

the anti-stiction structure comprises a bypass area between a cross-section of the wrench and a wrench gage diameter, the bypass area being greater than 0.16 square inches.

8. The apparatus according to claim 5, wherein:

the anti-stiction structure comprises a nonzero bypass area between a blocking cross-section of the wrench and a wrench gage diameter.

9. The apparatus according to claim 6, wherein:

the bypass area comprises a vent formed in the wrench housing.

10. The apparatus according to claim 9, wherein:

the vent comprises a scallop disposed at a housing perimeter.

11. The apparatus according to claim 1, wherein:

a body of the housing comprises a scallop to resist stiction during insertion and withdrawal of the housing into and from an access conduit extending toward a target stop and waste valve.

12. An apparatus, comprising:

a housing defining a volume between a distal face and a proximal face;

a plurality of parallel bores distributed in the volume to dispose a distal end of each bore as an opening communicating through the distal face;

a plurality of fingers, at least one finger of the fingers comprising a working end and a held portion, the working end being configured and arranged to protrude distally beyond the distal face to a desired extended position, the held portion to fit in registration inside one of the bores for reciprocal displacement parallel to a bore length axis: wherein:

the bores are arrayed to dispose distal ends of adjacent fingers in a spaced apart relationship to resist direct transverse load transfer from a distal portion of a load-carrying finger to an adjacent finger; and further comprising:

a plurality of stop elements, at least one stop element of the stop elements to resist displacement of the working end of the at least one finger in a distal direction beyond the desired extended position; and a plurality of biasing elements, at least one biasing element of the biasing elements to urge motion of the at least one finger in a distal direction, wherein:

the housing comprises a front wall associated with the distal face and a rear wall associated with the proximal face, the front wall and rear wall cooperating to capture a full complement of installed fingers and biasing elements inside the housing and in registration for reciprocal displacement along respective bore length axes during assembly of the housing;

the housing comprises anti-stiction structure to resist stiction during insertion and withdrawal of the housing into and from an access port having a two inch inside diameter and extending from a ground surface opening toward a target subterranean stop and waste valve, the anti-stiction structure comprising a bypass area between a blocking cross-section area of the housing and an open cross-section of the access port, the bypass area being greater than 0.14 square inches; and the at least one finger comprises a cylindrical held portion having a first diameter and a cylindrical working end having a second diameter, the first diameter being greater than the second diameter, a first shoulder disposed between the first diameter and the second diameter;

the at least one stop element comprises a protrusion disposed in one of the bores to form a structural interference between the first shoulder and the protrusion;

the apparatus further comprising:

an attachment mechanism configured to removably couple the housing to the distal end of an elongate shaft to dispose a desired axis of rotation of the housing substantially collinear with the length axis of the shaft, the shaft to apply a torque to the housing, the attachment mechanism comprising a primary coupling element and a redundant secondary coupling element to resist axial separation between the housing and the shaft.

* * * * *